(12) United States Patent
Lu

(10) Patent No.: US 10,079,910 B1
(45) Date of Patent: *Sep. 18, 2018

(54) ITERATIVE COVARIANCE CALCULATION FOR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

(*) Notice: Subject to any disclaimer, the term of this patent is extended or adjusted under 35 U.S.C. 154(b) by 210 days.

This patent is subject to a terminal disclaimer.

(21) Appl. No.: 14/964,218

(22) Filed: Dec. 9, 2015

Related U.S. Application Data

(60) Provisional application No. 62/089,252, filed on Dec. 9, 2014.

(51) Int. Cl.
*G06F 15/16* (2006.01)
*H04L 29/08* (2006.01)
*H04L 12/813* (2013.01)

(52) U.S. Cl.
CPC .............. *H04L 67/32* (2013.01); *H04L 47/20* (2013.01)

(58) Field of Classification Search
CPC ......... G06F 17/18; G06F 17/15; H04L 47/20; H04L 67/32; H04L 65/60
See application file for complete search history.

(56) References Cited

U.S. PATENT DOCUMENTS

| 7,716,155 B2* | 5/2010 | Aggarwal ......... G06F 17/30516 706/46 |
| 7,747,413 B2 | 6/2010 | Ramsey et al. |
| 7,840,377 B2 | 11/2010 | Ramsey et al. |
| 8,321,422 B1* | 11/2012 | Kwatra ................... G06F 17/18 382/103 |
| 9,069,726 B2 | 6/2015 | Lu |
| 2014/0164456 A1 | 6/2014 | Lu |
| 2015/0046571 A1* | 2/2015 | Ramamurthy .......... H04L 65/80 709/219 |

FOREIGN PATENT DOCUMENTS

| WO | WO-2014093540 A2 | 6/2014 |
| WO | WO-2014093540 A3 | 9/2014 |

* cited by examiner

*Primary Examiner* — Kim T Nguyen

(57) ABSTRACT

The present invention extends to methods, systems, and computing system program products for iteratively calculating covariance for Big Data. Embodiments of the invention include iteratively calculating one or more components of a covariance for two modified computation subsets based on one or more components of a covariance for two previous computation subsets and then calculate the covariance for two modified computation subsets based on the iteratively calculated components. Iteratively calculating covariance avoids visiting all data elements in the modified computation subsets and performing redundant computations thereby increasing calculation efficiency, saving computing resources and reducing computing system's power consumption.

20 Claims, 28 Drawing Sheets

The Definitions of Covariance:

Suppose computation subset $X$ composes of $n$ data elements: $X = \{x_i | i = 1, \ldots, n\}$ and computation subset $Y$ composes of $n$ data elements: $Y = \{y_i | i = 1, \ldots, n\}$.

Define the sum of $X$ with size $n$ in the $k^{th}$ iteration respectively as below:

$$XS_k = x_1 + x_2 + x_3 + \cdots + x_n = \sum_1^n x_i \qquad 401$$

Define the sum of $Y$ with size $n$ in the $k^{th}$ iteration respectively as below:

$$YS_k = y_1 + y_2 + y_3 + \cdots + y_n = \sum_1^n y_i \qquad 402$$

Define the mean of $X$ with size $n$ in the $k^{th}$ iteration respectively as below:

$$\bar{x}_k = \frac{(x_1 + x_2 + x_3 + \cdots + x_n)}{n} = \frac{\sum_1^n x_i}{n} \qquad 403$$

Define the mean of $Y$ with size $n$ in the $k^{th}$ iteration respectively as below:

$$\bar{y}_k = \frac{(y_1 + y_2 + y_3 + \cdots + y_n)}{n} = \frac{\sum_1^n y_i}{n} \qquad 404$$

The sample covariance of $X$ and $Y$ in the $k^{th}$ iteration are defined as:

$$Cov_s(X,Y)_k = \frac{1}{n-1}\sum_1^n (x_i - \bar{x}_k)(y_i - \bar{y}_k) \qquad 405$$

The population covariance of $X$ and $Y$ in the $k^{th}$ iteration are defined as:

$$Cov_p(X,Y)_k = \frac{1}{n}\sum_1^n (x_i - \bar{x}_k)(y_i - \bar{y}_k) \qquad 406$$

Fig. 4A

Suppose the covariance of the two computation subsets each with a fixed size $n$ needs to be calculated again after an existing pair of data elements $(x_r, y_r)$ in $X$ and $Y$ is removed and a pair of data elements $(x_a, y_a)$ is added to $X$ and $Y$.

Define the sum of $X$ with size $n$ in the k+1$^{th}$ iteration respectively as below:

$$XS_{k+1} = x_1 + x_2 + x_3 + \cdots + x_n + x_a - x_r = \sum_1^n x_i + x_a - x_r \qquad 407$$

Define the sum of $Y$ with size $n$ in the k+1$^{th}$ iteration respectively as below:

$$YS_{k+1} = y_1 + y_2 + y_3 + \cdots + y_n + y_a - y_r = \sum_1^n y_i + y_a - y_r \qquad 408$$

Define the mean of $X$ with size $n$ in the k+1$^{th}$ iteration respectively as below:

$$\bar{x}_{k+1} = \frac{(x_1 + x_2 + \cdots + x_n + x_a - x_r)}{n} = \frac{\sum_1^n x_i + x_a - x_r}{n} \qquad 409$$

Define the mean of $Y$ with size $n$ in the k+1$^{th}$ iteration respectively as below:

$$\bar{y}_{k+1} = \frac{(y_1 + y_2 + \cdots + y_n + y_a - y_r)}{n} = \frac{\sum_1^n y_i + y_a - y_r}{n} \qquad 410$$

The sample covariance in the k+1$^{th}$ iteration are defined as:

$$Cov_s(X, Y)_{k+1} = \frac{1}{n-1} \left( \sum_1^n (x_i - \bar{x}_{k+1})(y_i - \bar{y}_{k+1}) + (x_a - \bar{x}_{k+1})(y_a - \bar{y}_{k+1}) - (x_r - \bar{x}_{k+1})(y_r - \bar{y}_{k+1}) \right)$$
$$411$$

The population covariance in the k+1$^{th}$ iteration are defined as:

$$Cov_p(X, Y)_{k+1} = \frac{1}{n} \left( \sum_1^n (x_i - \bar{x}_{k+1})(y_i - \bar{y}_{k+1}) + (x_a - \bar{x}_{k+1})(y_a - \bar{y}_{k+1}) - (x_r - \bar{x}_{k+1})(y_r - \bar{y}_{k+1}) \right)$$
$$412$$

Fig. 4A Cont'd

Some Example Components of a Covariance:

A component of a covariance is a quantity or expression appearing in a covariance's definition equation or any transforms of the definition equation. The following are a few example components of a covariance.

- $XS_k = \sum_1^n x_i$
- $YS_k = \sum_1^n y_i$
- $\bar{x}_k = \frac{XS_k}{n} = \frac{1}{n}\sum_1^n x_i$
- $\bar{y}_k = \frac{YS_k}{n} = \frac{1}{n}\sum_1^n y_i$
- $SXY_k = \sum_1^n x_i y_i$
- $SDXY_k = \sum_1^n (x_i - \bar{x}_k)(y_i - \bar{y}_k)$
- $Cov_s(X,Y)_k = \frac{1}{n-1}\sum_1^n (x_i - \bar{x}_k)(y_i - \bar{y}_k)$ for a sample covariance
- $Cov_p(X,Y)_k = \frac{1}{n}\sum_1^n (x_i - \bar{x}_k)(y_i - \bar{y}_k)$ for a population covariance Basic Iterative Component Calculation Equations:

The sum and/or mean of the data within a computation subset will be used by several examples of iterative algorithms described in the following sections, so the equations are put here instead of in each algorithms.

According to the definitions of $XS_{k+1}, YS_{k+1}, \bar{x}_{k+1}$ and $\bar{y}_{k+1}$, they can be calculated in an iterative way:

$XS_{k+1} = XS_k + x_a - x_r$ ⌒‿413

$YS_{k+1} = YS_k + y_a - y_r$ ⌒‿414

$\bar{x}_{k+1} = \frac{XS_{k+1}}{n} = \bar{x}_k + \frac{x_a - x_r}{n}$ ⌒‿415

$\bar{y}_{k+1} = \frac{YS_{k+1}}{n} = \bar{y}_k + \frac{y_a - y_r}{n}$ ⌒‿416

Fig. 4B

Iterative Algorithm 1:

Sample covariance $\frac{1}{n-1}\sum_1^n(x_i - \bar{x}_k)(y_i - \bar{y}_k)$ itself is a component of sample covariance. Sample covariance can be iteratively calculated based on sample covariance in previous computation subset and a pair of components $(YS_k, \bar{x}_{k+1})$, $(\bar{y}_k, XS_{k+1})$, $(YS_k, XS_{k+1})$, $(\bar{y}_k, \bar{x}_{k+1})$, $(XS_k, \bar{y}_{k+1})$, $(\bar{x}_k, YS_{k+1})$, $(XS_k, YS_{k+1})$, or $(\bar{x}_k, \bar{y}_{k+1})$ defined in Figure 4A and Figure 4B.

$$Cov_s(X,Y)_{k+1} = Cov_s(X,Y)_k + \frac{(y_a-YS_k/n)(x_a-x_r)+(y_a-y_r)(x_r-\bar{x}_{k+1})}{n-1} = Cov_s(X,Y)_k +$$
$$\frac{(y_a-\bar{y}_k)(x_a-x_r)+(y_a-y_r)(x_r-XS_{k+1}/n)}{n-1} = Cov_s(X,Y)_k + \frac{(y_a-YS_k/n)(x_a-x_r)+(y_a-y_r)(x_r-XS_{k+1}/n)}{n-1} =$$
$$Cov_s(X,Y)_k + \frac{(y_a-\bar{y}_k)(x_a-x_r)+(y_a-y_r)(x_r-\bar{x}_{k+1})}{n-1} = Cov_s(X,Y)_k + \frac{(x_a-XS_k/n)(y_a-y_r)+(x_a-x_r)(y_r-\bar{y}_{k+1})}{n-1} =$$
$$Cov_s(X,Y)_k + \frac{(x_a-\bar{x}_k)(y_a-y_r)+(x_a-x_r)(y_r-YS_{k+1}/n)}{n-1} = Cov_s(X,Y)_k +$$
$$\frac{(x_a-XS_k/n)(y_a-y_r)+(x_a-x_r)(y_r-YS_{k+1}/n)}{n-1} = Cov_s(X,Y)_k + \frac{(x_a-\bar{x}_k)(y_a-y_r)+(x_a-x_r)(y_r-\bar{y}_{k+1})}{n-1}$$

417

Population covariance $\frac{1}{n}\sum_1^n(x_i - \bar{x}_k)(y_i - \bar{y}_k)$ itself is a component of population covariance. Population variance can be iteratively calculated based on population variance in previous computation subset and a pair of two components $(YS_k, \bar{x}_{k+1})$, $(\bar{y}_k, XS_{k+1})$, $(YS_k, XS_{k+1})$, $(\bar{y}_k, \bar{x}_{k+1})$, $(XS_k, \bar{y}_{k+1})$, $(\bar{x}_k, YS_{k+1})$, $(XS_k, YS_{k+1})$, or $(\bar{x}_k, \bar{y}_{k+1})$ defined in Figure 4A and Figure 4B.

$$Cov_p(X,Y)_{k+1} = Cov_p(X,Y)_k + \frac{(y_a-YS_k/n)(x_a-x_r)+(y_a-y_r)(x_r-\bar{x}_{k+1})}{n} = Cov_p(X,Y)_k +$$
$$\frac{(y_a-\bar{y}_k)(x_a-x_r)+(y_a-y_r)(x_r-XS_{k+1}/n)}{n} = Cov_p(X,Y)_k + \frac{(y_a-YS_k/n)(x_a-x_r)+(y_a-y_r)(x_r-XS_{k+1}/n)}{n} =$$
$$Cov_p(X,Y)_k + \frac{(y_a-\bar{y}_k)(x_a-x_r)+(y_a-y_r)(x_r-\bar{x}_{k+1})}{n} = Cov_p(X,Y)_k + \frac{(x_a-XS_k/n)(y_a-y_r)+(x_a-x_r)(y_r-\bar{y}_{k+1})}{n} =$$
$$Cov_p(X,Y)_k + \frac{(x_a-\bar{x}_k)(y_a-y_r)+(x_a-x_r)(y_r-YS_{k+1}/n)}{n} = Cov_p(X,Y)_k +$$
$$\frac{(x_a-XS_k/n)(y_a-y_r)+(x_a-x_r)(y_r-YS_{k+1}/n)}{n} = Cov_p(X,Y)_k + \frac{(x_a-\bar{x}_k)(y_a-y_r)+(x_a-x_r)(y_r-\bar{y}_{k+1})}{n}$$

Iterative Algorithm 2:

$\sum_1^n (x_i - \bar{x}_k)(y_i - \bar{y}_k)$ is a component of covariance. $\sum_1^n (x_i - \bar{x}_k)(y_i - \bar{y}_k)$ can be iteratively calculated based on another pair of components $(YS_k, \bar{x}_{k+1})$, $(\bar{y}_k, XS_{k+1})$, $(YS_k, XS_{k+1})$, $(\bar{y}_k, \bar{x}_{k+1})$, $(XS_k, \bar{y}_{k+1})$, $(\bar{x}_k, YS_{k+1})$, $(XS_k, YS_{k+1})$, or $(\bar{x}_k, \bar{y}_{k+1})$ defined in Figure 4A and Figure 4B.

Define $SDXY_k = \sum_1^n (x_i - \bar{x}_k)(y_i - \bar{y}_k)$ and $SDXY_{k+1} = \sum_1^n (x_i - \bar{x}_{k+1})(y_i - \bar{y}_{k+1}) + (x_a - \bar{x}_{k+1})(y_a - \bar{y}_{k+1}) - (x_r - \bar{x}_{k+1})(y_r - \bar{y}_{k+1})$, then $SDXY_{k+1}$ can be iteratively calculated.

$SDXY_{k+1} = SDXY_k + (y_a - YS_k/n)(x_a - x_r) + (y_a - y_r)(x_r - \bar{x}_{k+1}) = SDXY_k + (y_a - \bar{y}_k)(x_a - x_r) + (y_a - y_r)(x_r - XS_{k+1}/n) = SDXY_k + (y_a - YS_k/n)(x_a - x_r) + (y_a - y_r)(x_r - XS_{k+1}/n) = SDXY_k + (y_a - \bar{y}_k)(x_a - x_r) + (y_a - y_r)(x_r - \bar{x}_{k+1}) = SDXY_k + (x_a - XS_k/n)(y_a - y_r) + (x_a - x_r)(y_r - \bar{y}_{k+1}) = SDXY_k + (x_a - \bar{x}_k)(y_a - y_r) + (x_a - x)(y_r - YS_{k+1}/n) = SDXY_k + (x_a - XS_k/n)(y_a - y_r) + (x_a - x_r)(y_r - YS_{k+1}/n) = SDXY_k + (x_a - \bar{x}_k)(y_a - y_r) + (x_a - x_r)(y_r - \bar{y}_{k+1})$

419

Once $SDXY_{k+1}$ is calculated, then $Cov_s(X,Y)_{k+1} = \frac{SDXY_{k+1}}{n-1}$  420

$Cov_p(X,Y)_{k+1} = \frac{SDXY_{k+1}}{n}$  421

Fig. 4D

Iterative Algorithm 3:

Covariance is calculated based on a pair of two components $XS_{k+1}$ or $\bar{x}_{k+1}$ and $YS_{k+1}$ or $\bar{y}_{k+1}$ defined in Figure 4A and Figure 4B and $SXY_{k+1}$ defined below.

$SXY_k = \sum_1^n x_i y_i$ ⌒‿422

$SXY_{k+1} = \sum_1^n x_i y_i + x_a y_a - x_r y_r$ ⌒‿423

$SXY_{k+1}$ can be calculated in an iterative way:

$SXY_{k+1} = SXY_k + x_a y_a - x_r y_r$ ⌒‿424

Once $XS_{k+1}$ or $\bar{x}_{k+1}$, $YS_{k+1}$ or $\bar{y}_{k+1}$ and $SXY_{k+1}$ are calculated, then covariance can be calculated by $$Cov_s(X,Y)_{k+1} = \frac{SXY_{k+1} - XS_{k+1}\bar{y}_{k+1}}{n-1} = \frac{SXY_{k+1} - \bar{x}_{k+1}YS_{k+1}}{n-1} = \frac{SXY_{k+1} - XS_{k+1}YS_{k+1}/n}{n-1} = \frac{SXY_{k+1} - n\bar{x}_{k+1}\bar{y}_{k+1}}{n-1}$$
⌒‿425

$$Cov_p(X,Y)_{k+1} = \frac{SXY_{k+1} - XS_{k+1}\bar{y}_{k+1}}{n} = \frac{SXY_{k+1} - \bar{x}_{k+1}YS_{k+1}}{n} = \frac{SXY_{k+1} - XS_{k+1}YS_{k+1}/n}{n} = \frac{SXY_{k+1}}{n} - \bar{x}_{k+1}\bar{y}_{k+1}$$
⌒‿426

Fig. 4E

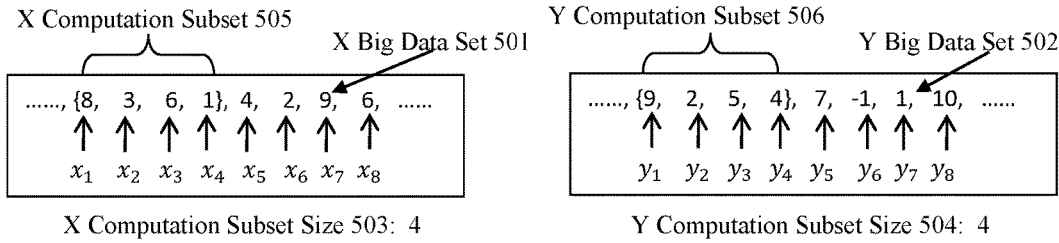

X Computation Subset Size 503: 4     Y Computation Subset Size 504: 4

Calculate Covariance for X Computation Subset 505 and Y Computation Subset 506

Traditional Algorithm:

1. Use equation 403 to calculate the mean of the data elements in X computation subset 503:

$$\bar{x}_1 = \frac{8+3+6+1}{4} = \frac{18}{4} = 4.5$$

Operations in this step: 1 division, 3 additions

2. Use equation 404 to calculate the mean of the data elements in Y computation subset 505:

$$\bar{y}_1 = \frac{9+2+5+4}{4} = \frac{20}{4} = 5$$

Operations in this step: 1 division, 3 additions

3. Use equation 405 to calculate $Cov_s(X,Y)_1$ for the 1st iteration:

$$Cov_s(X,Y)_1 = \frac{1}{4-1}\sum_1^4(x_i - \bar{x}_1)(y_i - \bar{y}_1) = \frac{1}{4-1}\big((8-4.5)(9-5) + (3-4.5)(2-5) +$$
$$(6-4.5)(5-5) + (1-4.5)(4-5)\big) = \frac{1}{3}(14 + 4.5 + 0 + 3.5) = \frac{1}{3} \times 22 = 7.3333333333333333$$

Operations in this step: 1 division, 4 multiplications, 3 additions, 9 subtractions There are a total of 3 divisions, 4 multiplications, 9 additions and 9 subtractions.

Fig. 5A

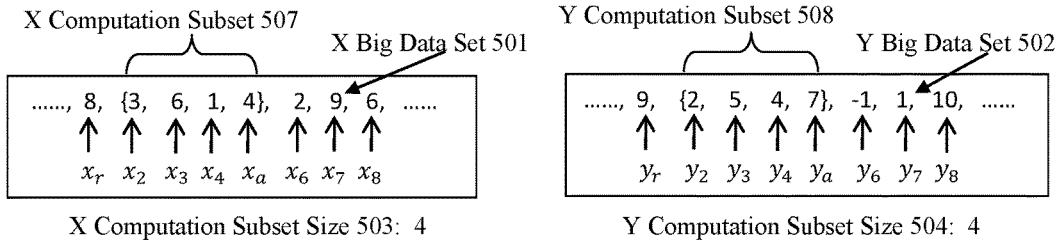

X Computation Subset Size 503: 4    Y Computation Subset Size 504: 4

<u>Calculate Covariance for $X$ Computation Subset 507 and $Y$ Computation Subset 508</u>

Traditional Algorithm:

1. Use equation 403 to calculate the mean of the data elements in X computation subset 507:

$$\bar{x}_2 = \frac{3+6+1+4}{4} = \frac{14}{4} = 3.5$$

Operations in this step: 1 division, 3 additions

2. Use equation 404 to calculate the mean of the data elements in Y computation subset 508:

$$\bar{y}_2 = \frac{2+5+4+7}{4} = \frac{18}{4} = 4.5$$

Operations in this step: 1 division, 3 additions

3. Calculate $Cov_s(X,Y)_2$ for the 2$^{nd}$ iteration:

$Cov_s(X,Y)_2 = \frac{1}{4-1}\left(\sum_{2}^{4}(x_i - \bar{x}_2)(y_i - \bar{y}_2) + (x_a - \bar{x}_2)(y_a - \bar{y}_2)\right) = \frac{1}{4-1}((3 - 3.5)(2 - 4.5) + (6 - 3.5)(5 - 4.5) + (1 - 3.5)(4 - 4.5) + (4 - 3.5)(7 - 4.5)) = \frac{1}{3}(1.25 + 1.25 + 1.25 + 1.25) = \frac{1}{3} \times 5 = 1.666666666666667$ Operations in this step: 1 division, 4 multiplications, 3 additions, 9 subtractions There are a total of 3 divisions, 4 multiplications, 9 additions and 9 subtractions.

Fig. 5A Cont'd 1

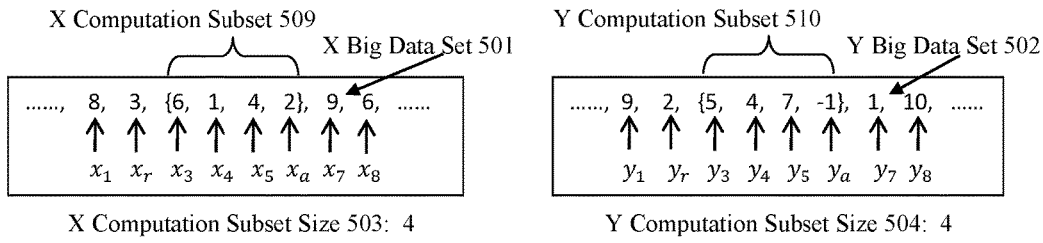

X Computation Subset Size 503: 4    Y Computation Subset Size 504: 4

Calculate Covariance for $X$ Computation Subset 509 and $Y$ Computation Subset 510

Traditional Algorithm:

1. Use equation 403 to calculate the mean of the data elements in X computation subset 509:

$$\bar{x}_3 = \frac{6+1+4+2}{4} = \frac{13}{4} = 3.25$$

Operations in this step: 1 division, 3 additions

2. Use equation 404 to calculate the mean of the data elements in Y computation subset 510:

$$\bar{y}_3 = \frac{5+4+7+(-1)}{4} = \frac{15}{4} = 3.75$$

Operations in this step: 1 division, 3 additions

3. Calculate $Cov_s(X,Y)_3$ for the 3$^{rd}$ iteration:

$Cov_s(X,Y)_3 = \frac{1}{4-1}\left(\sum_3^5(x_i - \bar{x}_3)(y_i - \bar{y}_3) + (x_a - \bar{x}_3)(y_a - \bar{y}_3)\right) = \frac{1}{4-1}((6 - 3.25)(5 - 3.75) + (1 - 3.25)(4 - 3.75) + (4 - 3.25)(7 - 3.75) + (2 - 3.25)(-1 - 3.75)) = \frac{1}{3}(3.4375 - 0.5625 + 2.4375 + 5.9375) = \frac{1}{3} \times 11.25 = 3.75$ Operations in this step: 1 division, 4 multiplications, 3 additions, 9 subtractions There are a total of 3 divisions, 4 multiplications, 9 additions and 9 subtractions.

For two computation subsets each of n data elements, traditional covariance algorithms typically use 3 divisions, $n$ multiplications, 3($n$-1) additions and 2$n$+1 subtractions when calculating sample covariance without any optimization.

Fig. 5A Cont'd 2

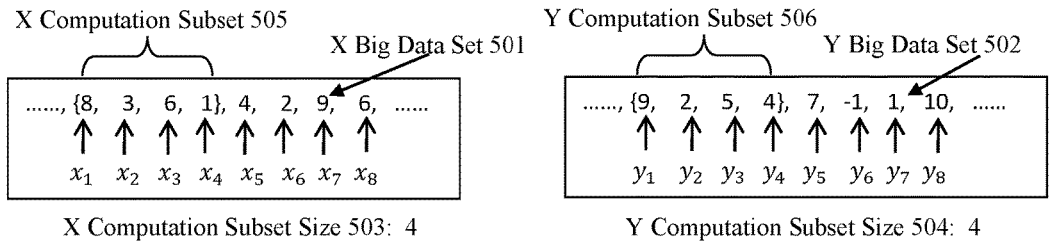

X Computation Subset Size 503: 4    Y Computation Subset Size 504: 4

Calculate Covariance for X Computation Subset 505 and Y Computation Subset 506

Iterative Algorithm 1:

1. Use equation 403 to calculate $\bar{x}_1$ for the 1st iteration:

$$\bar{x}_1 = \frac{8+3+6+1}{4} = 4.5$$

Operations in this step: 1 division, 3 additions

2. Use equation 404 to calculate $\bar{y}_1$ for the 1st iteration:

$$\bar{y}_1 = \frac{9+2+5+4}{4} = 5$$

Operations in this step: 1 division, 3 additions

3. Use equation 405 to calculate $Cov_s(X,Y)_1$ for the 1st iteration:

$$Cov_s(X,Y)_1 = \frac{1}{4-1}\sum_1^4(x_i - \bar{x}_1)(y_i - \bar{y}_1) = \frac{1}{4-1}\big((8-4.5)(9-5) + (3-4.5)(2-5) + (6-4.5)(5-5) + (1-4.5)(4-5)\big) = 7.3333333333333333$$

Operations in this step: 1 division, 4 multiplications, 3 additions, 9 subtractions There are a total of 3 divisions, 4 multiplications, 9 additions and 9 subtractions.

Fig. 5B

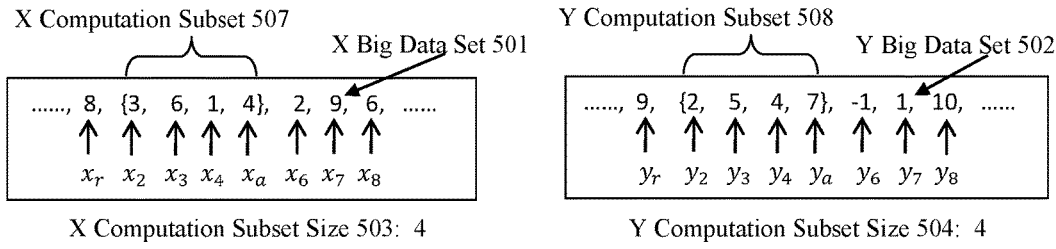

X Computation Subset Size 503: 4    Y Computation Subset Size 504: 4

Calculate Covariance for $X$ Computation Subset 507 and $Y$ Computation Subset 508

Iterative Algorithm 1:

1. Use equation 415 to calculate $\bar{x}_2$ for the 2$^{nd}$ iteration:

$\bar{x}_2 = \bar{x}_1 + \frac{(x_a - x_r)}{4} = 4.5 + \frac{(4-8)}{4} = 3.5$

Operations in this step: 1 division, 1 addition, 1 subtraction

2. Use equation 416 to calculate $\bar{y}_2$ for the 2$^{nd}$ iteration:

$\bar{y}_2 = \bar{y}_1 + \frac{(y_a - y_r)}{4} = 5 + \frac{(7-9)}{4} = 4.5$

Operations in this step: 1 division, 1 addition, 1 subtraction

3. Use equation 417 to iteratively calculate covariance $Cov_s(X,Y)_2$ for the 2$^{nd}$ iteration:

$Cov_s(X,Y)_2 = Cov_s(X,Y)_1 + \frac{(y_a - \bar{y}_1)(x_a - x_r) + (y_a - y_r)(x_r - \bar{x}_2)}{4-1} = 7.3333333333333333 + \frac{(7-5)(4-8) + (7-9)(8-3.5)}{3} = 7.3333333333333333 + \frac{-8+(-9)}{3} = 1.6666666666666666$ Operations in this step: 1 division, 2 multiplications, 2 additions, 5 subtractions There are a total of 3 divisions, 2 multiplications, 4 additions and 7 subtractions.

Fig. 5B Cont'd 1

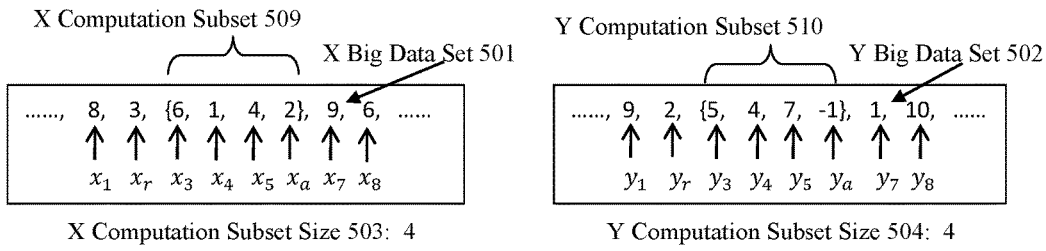

Calculate Covariance for X Computation Subset 509 and Y Computation Subset 510

Iterative Algorithm 1:

1. Use equation 415 to calculate $\bar{x}_3$ for the 3$^{rd}$ iteration:

$\bar{x}_3 = \bar{x}_2 + \frac{(x_a - x_r)}{4} = 3.5 + \frac{(2-3)}{4} = 3.25$

Operations in this step: 1 division, 1 addition, 1 subtraction

2. Use equation 416 to calculate $\bar{y}_3$ for the 3$^{rd}$ iteration:

$\bar{y}_3 = \bar{y}_2 + \frac{(y_a - y_r)}{4} = 4.5 + \frac{(-1-2)}{4} = 3.75$

Operations in this step: 1 division, 1 addition, 1 subtraction

3. Use equation 417 to iteratively calculate covariance $Cov_s(X,Y)_3$ for the 3$^{rd}$ iteration:

$Cov_s(X,Y)_3 = Cov_s(X,Y)_2 + \frac{(y_a - \bar{y}_2)(x_a - x_r) + (y_a - y_r)(x_r - \bar{x}_3)}{4-1} = 1.6666666666666666 + \frac{(-1-4.5)(2-3)+(-1-2)(3-3.25)}{3} = 1.6666666666666666 + \frac{5.5+0.75}{3} = 1.6666666666666666 + \frac{6.25}{3} = 1.6666666666666666 + 2.0833333333333333 = 3.7499999999999999$*

Operations in this step: 1 division, 2 multiplications, 2 additions, 5 subtractions There are a total of 3 divisions, 2 multiplications, 4 additions and 7 subtractions.

*: The difference between the iterative algorithm's result 3.7499999999999999 and the traditional algorithm's result 3.75 is due to rounding error.

Fig. 5B Cont'd 2

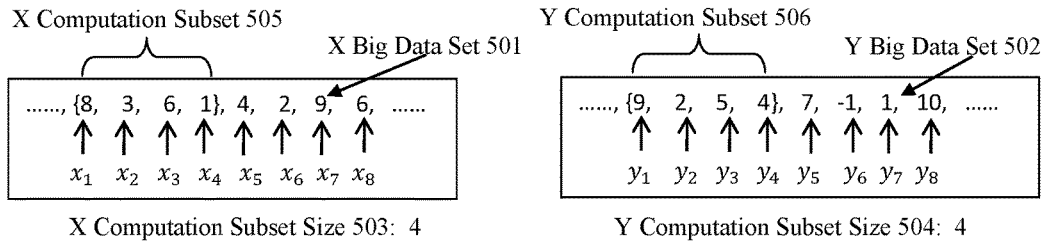

Calculate Covariance for X Computation Subset 505 and Y Computation Subset 506

Iterative Algorithm 2:

1. Use equation 403 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 404 to calculate $\bar{y}_1$ for the 1st iteration:

$$\bar{y}_1 = \frac{9+2+5+4}{4} = \frac{20}{4} = 5$$

Operations in this step: 1 division, 3 additions

4. Calculate $SDXY_1$ for the 1st iteration:

$$SDXY_1 = \sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 14 + 4.5 + 0 + 3.5 = 22$$

Operations in this step: 4 multiplications, 3 additions, 8 subtractions

5. Use equation 405 to calculate $Cov_s(X,Y)_1$ for the 1st iteration:

$$Cov_s(X,Y)_1 = \frac{\sum_1^4 (x_i - \bar{x}_1)(y_i - \bar{y}_1)}{4-1} = \frac{SDXY_1}{4-1} = \frac{22}{3} = 7.3333333333333333$$

Operations in this step: 1 division, 1 subtraction

There are a total of 3 divisions, 4 multiplications, 9 additions and 9 subtractions.

Fig. 5C

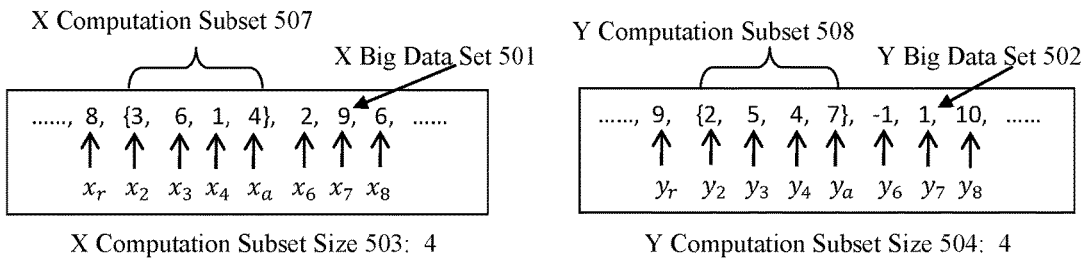

X Computation Subset Size 503: 4     Y Computation Subset Size 504: 4

Calculate Covariance for *X* Computation Subset 507 and *Y* Computation Subset 508

Iterative Algorithm 2:

1. Use equation 415 to calculate $\bar{x}_2$ for the 2$^{nd}$ iteration:

$$\bar{x}_2 = \bar{x}_1 + \frac{(x_a - x_r)}{4} = 4.5 + \frac{(4-8)}{4} = 3.5$$

Operations in this step: 1 division, 1 addition, 1 subtraction

2. Use equation 416 to calculate $\bar{y}_2$ for the 2$^{nd}$ iteration:

$$\bar{y}_2 = \bar{y}_1 + \frac{(y_a - y_r)}{4} = 5 + \frac{(7-9)}{4} = 4.5$$

Operations in this step: 1 division, 1 addition, 1 subtraction

3. Use equation 419 to iteratively calculate $XY_2$ for the 2$^{nd}$ iteration:

$SDXY_2 = SDXY_1 + (y_a - \bar{y}_1)(x_a - x_r) + (y_a - y_r)(x_r - \bar{x}_2) = 22 + (7-5)(4-8) + (7-9)(8-3.5) = 22 + (-8) + (-9) = 5$ Operations in this step: 2 multiplications, 2 additions, 4 subtractions 4. Use equation 420 to calculate $Cov_s(X,Y)_2$ for the 2$^{nd}$ iteration:

$$Cov_s(X,Y)_2 = \frac{SDXY_2}{4-1} = \frac{5}{3} = 1.6666666666666667$$

Operations in this step: 1 division, 1 subtraction

There are a total of 3 divisions, 2 multiplications, 4 additions and 7 subtractions.

Fig. 5C Cont'd 1

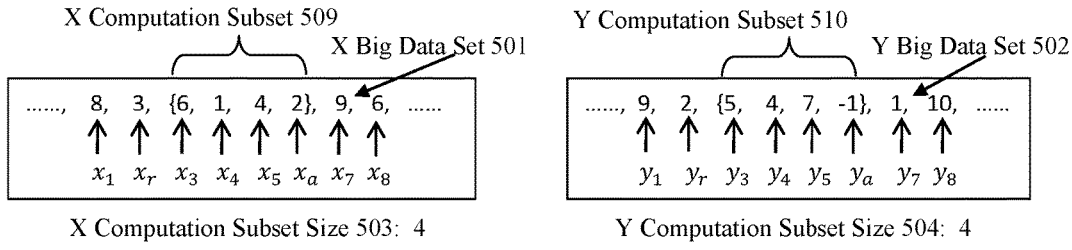

Calculate Covariance for *X* Computation Subset 509 and *Y* Computation Subset 510

Iterative Algorithm 2:

1. Use equation 415 to calculate $\bar{x}_3$ for the 3<sup>rd</sup> Iteration:

$\bar{x}_3 = \bar{x}_2 + \frac{(x_a - x_r)}{4} = 3.5 + \frac{(2-3)}{4} = 3.25$

Operations in this step: 1 division, 1 addition, 1 subtraction

2. Use equation 416 to calculate $\bar{y}_3$ for the 3<sup>rd</sup> Iteration:

$\bar{y}_3 = \bar{y}_2 + \frac{(y_a - y_r)}{4} = 4.5 + \frac{(-1-2)}{4} = 3.75$

Operations in this step: 1 division, 1 addition, 1 subtraction

3. Use equation 419 to calculate $SDXY_3$ for the 3<sup>rd</sup> Iteration:

$SDXY_3 = SDXY_2 + (y_a - \bar{y}_2)(x_a - x_r) + (y_a - y_r)(x_r - \bar{x}_3) = 5 + (-1 - 4.5)(2 - 3) + (-1 - 2)(3 - 3.25) = 5 + 5.5 + 0.75 = 11.25$ Operations in this step: 2 multiplications, 2 additions, 4 subtractions 4. Use equation 420 to calculate $Cov_s(X,Y)_3$ for the 3<sup>rd</sup> Iteration:

$Cov_s(X,Y)_3 = \frac{SDXY_3}{4-1} = \frac{11.25}{3} = 3.75$

Operations in this step: 1 division, 1 subtraction

There are a total of 3 divisions, 2 multiplications, 4 additions and 7 subtractions.

Fig. 5C Cont'd 2

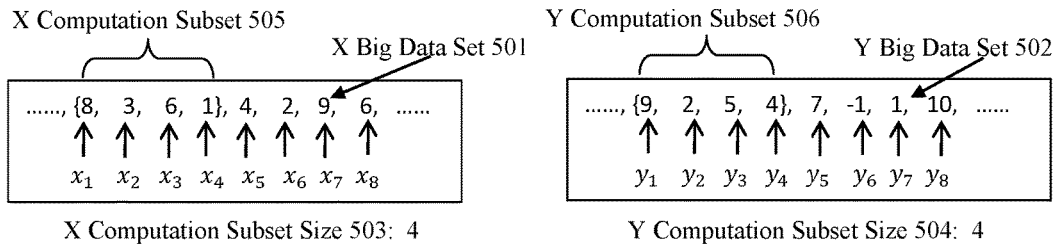

X Computation Subset Size 503: 4    Y Computation Subset Size 504: 4

Calculate Covariance for X Computation Subset 505 and Y Computation Subset 506

Iterative Algorithm 3:

1. Use equation 403 to calculate $\bar{x}_1$ for the 1$^{st}$ iteration:

$$\bar{x}_1 = \frac{8+3+6+1}{4} = \frac{18}{4} = 4.5$$

Operations in this step: 1 division, 3 additions

2. Use equation 404 to calculate $\bar{y}_1$ for the 1$^{st}$ iteration:

$$\bar{y}_1 = \frac{9+2+5+4}{4} = \frac{20}{4} = 5$$

Operations in this step: 1 division, 3 additions

3. Use equation 422 to calculate $SXY_1$ for the 1$^{st}$ iteration:

$$SXY_1 = \sum_1^4 x_i y_i = 8 \times 9 + 3 \times 2 + 6 \times 5 + 1 \times 4 = 112$$

Operations in this step: 4 multiplications, 3 additions

4. Use equation 405 to calculate $Cov_S(X,Y)_1$ for the 1$^{st}$ iteration:

$$Cov_S(X,Y)_1 = \frac{1}{4-1}\sum_1^4(x_i - \bar{x}_1)(y_i - \bar{y}_1) = \frac{1}{4-1}\big((8-4.5)(9-5) + (3-4.5)(2-5) +$$
$$(6-4.5)(5-5) + (1-4.5)(4-5)\big) = \frac{1}{3}(14 + 4.5 + 0 + 3.5) = 7.33333333333333333$$

Operations in this step: 1 division, 4 multiplications, 3 additions, 9 subtractions There are a total of 3 divisions, 8 multiplications, 12 additions and 9 subtractions.

Fig. 5D

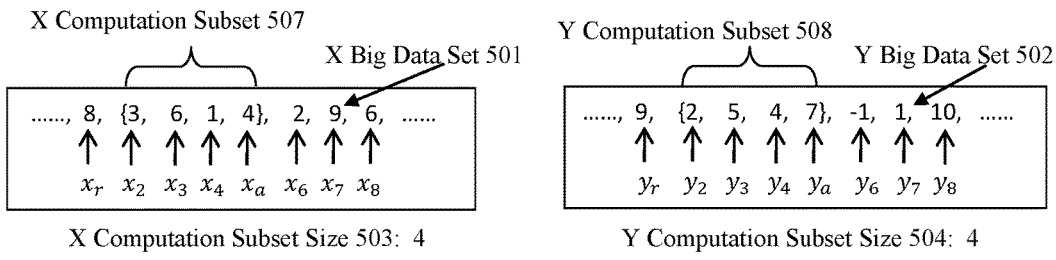

Calculate Covariance for $X$ Computation Subset 507 and $Y$ Computation Subset 508

Iterative Algorithm 3:

1. Use equation 415 to calculate $\bar{x}_2$ for the $2^{nd}$ iteration:

$$\bar{x}_2 = \bar{x}_1 + \frac{(x_a - x_r)}{4} = 4.5 + \frac{(4-8)}{4} = 3.5$$

Operations in this step: 1 division, 1 addition, 1 subtraction

2. Use equation 416 to calculate $\bar{y}_2$ for the $2^{nd}$ iteration:

$$\bar{y}_2 = \bar{y}_1 + \frac{(y_a - y_r)}{4} = 5 + \frac{(7-9)}{4} = 4.5$$

Operations in this step: 1 division, 1 addition, 1 subtraction

3. Use equation 424 to calculate $SXY_2$ for the $2^{nd}$ iteration:

$$SXY_2 = SXY_1 + x_a y_a - x_r y_r = 112 + 4 \times 7 - 8 \times 9 = 68$$

Operations in this step: 2 multiplications, 1 addition, 1 subtraction

4. Use equation 425 to calculate $Cov_s(X,Y)_2$ for the $2^{nd}$ iteration:

$$Cov_s(X,Y)_2 = \frac{SXY_2 - 4\bar{x}_2 \bar{y}_2}{4-1} = \frac{68 - 4 \times 3.5 \times 4.5}{3} = \frac{68-63}{3} = 1.6666666666666667$$

Operations in this step: 1 division, 2 multiplications, 2 subtractions

There are a total of 3 divisions, 4 multiplications, 3 additions and 5 subtractions.

Fig. 5D Cont'd 1

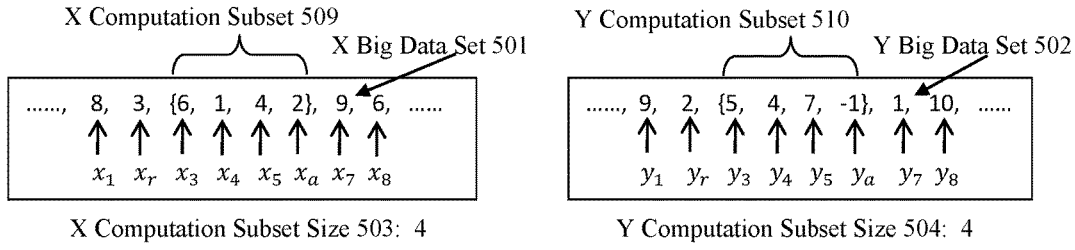

Calculate Covariance for *X* Computation Subset 509 and *Y* Computation Subset 510

Iterative Algorithm 3:

1. Use equation 415 to calculate $\bar{x}_3$ for the 3$^{rd}$ iteration:

$$\bar{x}_3 = \bar{x}_2 + \frac{(x_a - x_r)}{4} = 3.5 + \frac{(2-3)}{4} = 3.25$$

Operations in this step: 1 division, 1 addition, 1 subtraction

2. Use equation 416 to calculate $\bar{y}_3$ for the 3$^{rd}$ iteration:

$$\bar{y}_3 = \bar{y}_2 + \frac{(y_a - y_r)}{4} = 4.5 + \frac{(-1-2)}{4} = 3.75$$

Operations in this step: 1 division, 1 addition, 1 subtraction

3. Use equation 424 to iteratively calculate $SXY_3$ for the 3$^{rd}$ iteration:

$$SXY_3 = SXY_2 + x_a y_a - x_r y_r = 68 + 2 \times (-1) - 3 \times 2 = 60$$

Operations in this step: 2 multiplications, 1 addition, 1 subtraction

4. Calculate $Cov_s(X,Y)_3$ using equation 425 for the 3$^{rd}$ iteration:

$$Cov_s(X,Y)_3 = \frac{SXY_3 - 4\bar{x}_3\bar{y}_3}{4-1} = \frac{60 - 4 \times 3.25 \times 3.75}{3} = \frac{11.25}{3} = 3.75$$

Operations in this step: 1 division, 2 multiplications, 2 subtractions

There are a total of 3 divisions, 4 multiplications, 3 additions and 5 subtractions.

Fig. 5D Cont'd 2

|  | Division | Multiplication | Addition | Subtraction |
|---|---|---|---|---|
| Traditional Algorithm | 3 | 4 | 9 | 9 |
| Iterative Algorithm 1 | 3 | 2 | 4 | 7 |
| Iterative Algorithm 2 | 3 | 2 | 4 | 7 |
| Iterative Algorithm 3 | 3 | 4 | 3 | 5 |

|  | Division | Multiplication | Addition | Subtraction |
|---|---|---|---|---|
| Traditional Algorithm | 3 | 1,000,000 | 2,999,997 | 2,000,001 |
| Iterative Algorithm 1 | 3 | 2 | 4 | 7 |
| Iterative Algorithm 2 | 3 | 2 | 4 | 7 |
| Iterative Algorithm 3 | 3 | 4 | 3 | 5 |

# ITERATIVE COVARIANCE CALCULATION FOR STREAMED DATA USING COMPONENTS

CROSS-REFERENCE TO RELATED APPLICATIONS

This application claims the benefit of provisional patent application Ser. No. 62/089,252, filed 2014 Dec. 9 by the present inventor.

BACKGROUND AND RELEVANT ART

Internet, mobile communications, navigation, online gaming, sensing technologies and large scale computing infrastructures have produced large amounts of data sets every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Big Data sets are accumulated over time and they may be considered as a data stream with irregular time intervals. Streamed data may also be data continuously read from storage devices, e.g., storage devices on multi-computing devices which store a Big Data set.

Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require streaming processing due to their nature, e.g., audio, video and digital TV, etc.

Processing streamed data may include performing calculations on multiple data elements. Thus, a computing device receiving a stream of data elements typically includes a buffer so that some number of data elements may be stored. Processing the streamed data elements may include accessing data elements stored in the buffer. When performing statistical calculations on streamed data elements, buffer requirements may be quite large. For example, when calculating covariance a (potentially large) number of data elements may need to be accessed.

For streamed data processing, some statistical calculations are recalculated as new streamed data elements are received. Thus, the (potentially large) number of data elements may be repeatedly accessed. For example, it may be that a covariance is calculated for two computation windows and each computation window includes the last n data elements in one data stream respectively. As such, every time a new pair of data elements (one data element from each data stream) is accessed or received, each new element is added to the corresponding computation window and the current $n^{th}$ data element is moved out of the corresponding computation window respectively. The all 2n data elements in the two computation windows are then accessed to recalculate the covariance.

As such, each data element remains in the corresponding computation window for n covariance calculations before it is aged out of the computation window. Accordingly, each data element is read from the buffer n times. Performing statistical calculations on streamed data elements in this way is time consuming and is an inefficient use of resources. When performing a covariance calculation on two computation windows all the 2n (n pairs) data elements in the two computation windows will be visited and used, therefore performing statistical calculations on streamed data elements in this way is time consuming and inefficient.

Depending on necessity, the computation window size n may be extremely large, so the data elements in a computation window may be distributed over a cloud comprising hundreds of thousands of computing devices. Re-performing statistical calculations on streamed data in traditional ways results in slow response and significant waste of computing resources.

BRIEF SUMMARY

The present disclosure describes methods, systems, and computing system program products for iteratively calculating covariance for streamed data. A system comprising one or more computing devices includes one or two buffers on one or more storage media for storing streamed data elements. A computation window size indicates a specified number of data elements for filling each of two computation windows for the one or two buffers. The computation window, a subset of all data elements received from a data stream, contains the data elements involved in a covariance calculation. Iteratively calculating a covariance for two adjusted computation windows includes iteratively calculating one or more components of a covariance for the two adjusted computation windows based on one or more ($p(p \geq 1)$) components of the covariance for two previous computation windows and then calculating the covariance using one or more iteratively calculated components. Iteratively calculating the components of covariance avoids visiting all data elements in the two adjusted computation windows and performing redundant computations thereby increasing calculation efficiency, saving computing resources and reducing computing system's power consumption. A computing system includes one or two buffers for storing input data elements. A computation window size indicates a specified number of streamed data elements for filling computation windows for the one or two buffers. The one or two buffers may reside in memory or other non-transitory computer-readable media, such as a hard disk or other media, and may include multiple distributed files on multiple distributed computing devices, such as may be connected end-to-end to form a "circular buffer" or two "circular buffers".

The computing system initializes a computation window size n (n>1) and one or more components of a covariance for the two computation windows. The initialization of the computation window size comprises counting the number of data elements contained in each of the two computation windows or accessing or receiving a predefined computation window size. The initialization of the one or more components comprises calculating the one or more components through their definitions based on the data elements in the two computation windows or accessing or receiving pre-calculated one or more components from one or more computing-device-readable media.

The computing system receives a pair of data elements to be added to the two computation windows. The computing system stores the received pair of input data elements in the one or two buffers. The computing system adjusts the two computation windows by removing a least recently received pair of input data elements from the two computation windows and adding the to-be-added pair of input data elements to the two computation windows.

The computing system iteratively calculates one or more components of a covariance for the two adjusted computation windows based on the one or more components for the two computation windows.

The computing system iteratively calculating one or more components of a covariance for the two adjusted computation windows includes directly iteratively calculates v ($1 \leq v \leq p$) components for the two adjusted computation windows. Directly iteratively calculating the v components for the two adjusted computation windows includes accessing the removed pair of data elements, the added pair of data elements and the v components. Directly iteratively calculating the v components for the two adjusted computation windows includes calculating each of the v components one by one. Directly iteratively calculating each of the v components includes removing any contribution of the removed pair of data elements from each of the v components mathematically. Directly iteratively calculating each of the v components includes adding a contribution of the added pair of data elements to each of the v components mathematically.

The computing system iteratively calculating one or more components of a covariance for the two adjusted computation windows includes indirectly iteratively calculates w=p−v components as needed, i.e., the w components may be calculated when a covariance is accessed. Indirectly iteratively calculating the w components includes indirectly iteratively calculating each of the w components one by one. Indirectly iteratively calculating a component includes accessing and using one or more components other than said component itself.

The computing system generates a covariance as needed based on one or more iteratively calculated components, i.e., a covariance (either a sample covariance or a population covariance) may be calculated after multiple pairs of data elements being received instead of just one pair of data elements being received.

The computing system may keep receiving a pair of data elements to be added to the two computation windows, storing the received pair of data elements into one or two data buffers, adjusting the computation windows, iteratively calculating one or more components and calculating a covariance (either a sample covariance or a population covariance) as needed using one or more iteratively calculated components, and the computing device may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1C Cont'd illustrates the details about computation window 122X, adjusted computation window 122XA, adjusted computation window 122XB, computation window 122Y, adjusted computation window 122YA, and adjusted computation window 122YB.

FIG. 1D Cont'd illustrates the details about computation window 122X, adjusted computation window 122XA, adjusted computation window 122XB, computation window 122Y, adjusted computation window 122YA, and adjusted computation window 122YB.

FIG. 4A illustrates traditional equations for calculating a sample covariance and a population covariance respectively on two computation windows.

FIG. 4B illustrates some example components of a covariance, which may be used for iteratively calculating the covariance on two computation windows.

FIG. 4C illustrates the first example iterative covariance calculation algorithm (iterative algorithm 1) and its equations for iteratively calculating a sample covariance based on iteratively calculated sample covariance, and a population covariance based on iteratively calculated population covariance respectively using another pair of components $XS_{k+1}$ or $\bar{x}_{k+1}$ and $YS_k$ or $\bar{y}_k$, or $XS_k$ or $\bar{x}_k$ and $YS_{k+1}$ or $\bar{y}_{k+1}$, as defined and calculated in FIG. 4A and FIG. 4B.

FIG. 4D illustrates the second example iterative covariance calculation algorithm (iterative algorithm 2) and its equations for iteratively calculating a sample covariance and a population covariance respectively on two computation windows based on iteratively calculated component $SDXY_{k+1}$ and another pair of components $XS_{k+1}$ or $\bar{x}_{k+1}$ and $YS_k$ or $\bar{y}_k$, or $XS_k$ or $\bar{x}_k$ and $YS_{k+1}$ or $\bar{y}_{k+1}$, as defined and calculated in FIG. 4A and FIG. 4B.

FIG. 4E illustrates the third example iterative covariance calculation algorithm (iterative algorithm 3) and its equations for iteratively calculating a sample covariance and a population covariance respectively on two computation windows based on iteratively calculated components $XS_{k+1}$ or $\bar{x}_{k+1}$, $YS_{k+1}$ or $\bar{y}_{k+1}$, and $SXY_{k+1}$.

FIG. 5A illustrates an example of calculating sample covariance using traditional algorithms as shown in FIG. 4A.

FIG. 5B illustrates an example of calculating sample covariance using iterative algorithm 1 as shown in FIG. 4C.

FIG. 5C illustrates an example of calculating sample covariance using iterative algorithm 2 as shown in FIG. 4D.

FIG. 5D illustrates an example of calculating sample covariance using iterative algorithm 3 as shown in FIG. 4E.

FIG. 6 illustrates computational loads for traditional sample covariance algorithms and iterative sample covariance algorithms with a computation window of size 4.

FIG. 7 illustrates computational loads for traditional sample covariance algorithms and iterative sample covariance algorithms with a computation window of size 1,000,000.

DETAILED DESCRIPTION

Figure 1:
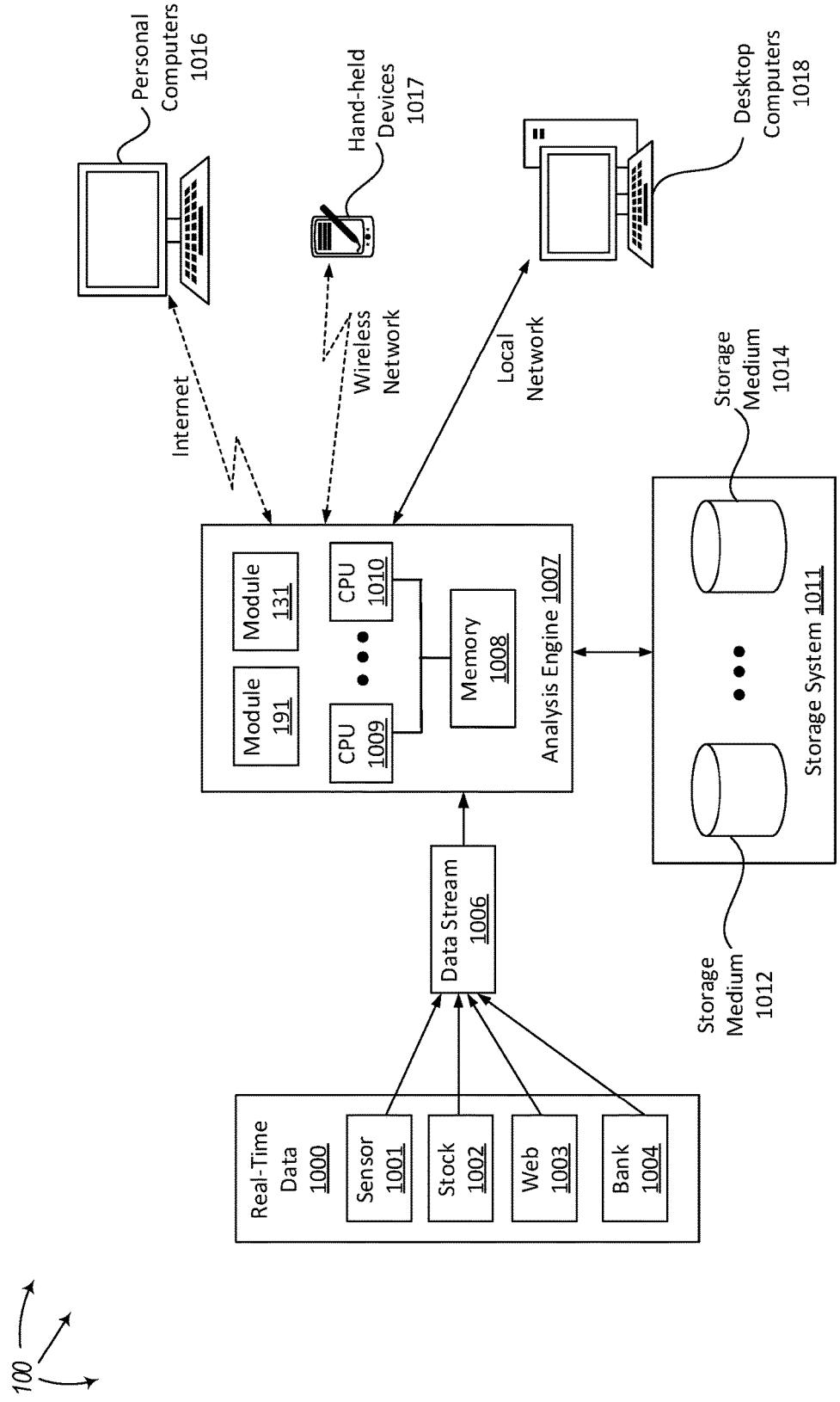
FIG. 1 illustrates a high-level overview of an example computing system that facilitates iteratively calculating covariance for streamed data.

The present disclosure describes methods, systems, and computing system program products for iteratively calculating covariance for streamed data. A system comprising one or more computing devices includes one or two buffers on one or more storage media for storing streamed data elements. A computation window size indicates a specified number of data elements for filling each of two computation windows for the one or two buffers. The computation window, a subset of all data elements received from a data stream, contains the data elements involved in a covariance calculation. Iteratively calculating a covariance for two adjusted computation windows includes iteratively calculating one or more ($p(p \geq 1)$) components of a covariance for the two adjusted computation windows based on one or more components of the covariance for two previous computation windows and then calculating the covariance using one or more iteratively calculated components. Iteratively calculating the components of covariance avoids visiting all data elements in the adjusted computation windows and performing redundant computations thereby increasing calculation efficiency, saving computing resources and reducing computing system's power consumption. The one or two buffers may reside in memory or other non-transitory computer-readable media, such as a hard disk or other media, and may include multiple distributed files on multiple distributed computing devices, such as may be connected end-to-end to form a "circular buffer" or two "circular buffers".

A covariance is a numerical assessment of how much one random variable varies together with another random variable. For two independent random variables, the covariance is zero. However, the converse is not true, e.g., a zero covariance doesn't mean the two random variables are independent to each other.

A covariance calculation works on two random variables, thus it works on two computation windows, each computation window containing a subset of the observation data from one of the two random variables. The two computation windows may be either input and stored separately or input and stored in a combined interleaved manner. For the former case, there will be two input streams and each input stream contains the data elements of one computation window respectively, and there will be two buffers and each buffer stores the data elements of one computation window respectively. For the latter case, there will be a single input stream and the input stream contains multiple data pairs with each data pair containing one data element from each computation window respectively.

A covariance may be calculated on a need basis. When a covariance is not accessed for every data change in the two computation windows, the computing device may just iteratively calculate the one or more components for each data change only. A covariance may be calculated using the one or more components and returned whenever it is accessed.

As used herein, a component of a covariance is a quantity or expression appearing in a covariance's definition equation or any transform of the definition equation. A covariance is the largest component of a covariance itself. A covariance may be calculated based on one or more its components or combinations of them. Some examples of components of a covariance may be found in FIG. 4B.

A component may be either directly iteratively calculated or indirectly iteratively calculated. The difference between them is that when directly iteratively calculating a component, the component is calculated based on the component's value in previous iteration but when indirectly iteratively calculating a component, the component is calculated based on components other than the component itself instead of the component in previous iteration.

For a given component, it might be directly iteratively calculated in one algorithm but indirectly iteratively calculated in another algorithm.

For a given algorithm, assume the total number of different components is p ($p \geq 1$), the number of directly calculated components is v ($1 \leq v \leq p$), then the number of indirectly iteratively calculated components is w=p−v ($0 \leq w < p$). For any algorithm, there will be at least one component being directly iteratively calculated. It is possible that all components are directly iteratively calculated (in this case v=p and w=0). However, directly iteratively calculated components must be calculated in every iteration no matter if a covariance is accessed or not in a specific iteration.

For a given algorithm, if a component is directly iteratively calculated, then the component must be calculated in every iteration (i.e., whenever a pair of data elements is removed from and a pair of data elements is added to the two computation windows). However, if a component is indirectly iteratively calculated, then the component only needs to be calculated as needed, i.e., when a covariance needs to be calculated and accessed. So, when a covariance is not accessed in a specific iteration, only a small number of components are iteratively calculated to save computation time. This may be useful when a covariance needs to be calculated after multiple pairs of data elements (e.g., two arrays of data elements instead of a pair of data elements) have been added to the two computation windows. Embodiments of the present invention may be extended to handle the above case by adding a loop to loop over two arrays of data elements one pair by one pair and within the loop directly iteratively calculating one or more components and after the loop either indirectly iteratively calculating one or more components or directly calculating a covariance. It should be understood that an indirectly iteratively calculated component may also be used in the calculation of a directly iteratively calculated component. In that case, the indirectly iteratively calculated component should also be calculated in every iteration.

The computing system accesses pairs of data elements for two computation windows of the one or two buffers. When using two buffers, each buffer contains the data elements of one computation window respectively. When using one buffer, the buffer contains interleaved data elements from the two computation windows. For streamed data processing, removing a data element or adding a data element generally happens at either end of the buffer.

The computing system initializes a computation window size n (n>1) and one or more components of a covariance for the two computation windows. The initialization of the computation window size comprises counting the number of data elements contained in each of the two computation windows or accessing or receiving a predefined computation window size. The initialization of the one or more components comprises calculating the one or more components through their definitions based on the data elements in the two computation windows or accessing or receiving pre-calculated one or more components from one or more computing-device-readable media.

The computing system receives a pair of data elements to be added to the two computation windows. The computing system stores the received pair of data elements in the one or two buffers. The computing system adjusts the two computation windows by: removing the least recently received pair of data elements from the two computation windows and adding the to-be-added pair of data elements to the two computation windows.

The computing system iteratively calculates one or more components of a covariance for the two adjusted computation windows and then calculates the covariance based on one or more iteratively calculated components. Iteratively calculating the one or more components includes calculating each of the one or more components for the two adjusted computation windows one by one.

The computing system iteratively calculating one or more components of a covariance for the two adjusted computation windows includes directly iteratively calculating v components. Directly iteratively calculating v components includes accessing the removed pair of data elements, the added pair of data elements and the v components. Directly iteratively calculating the v components includes directly iteratively calculating each of the v components one by one. Directly iteratively calculating a component includes removing any contribution of the removed pair of data elements from the component mathematically. Directly iteratively calculating a component includes adding a contribution of the added pair of data elements to the component mathematically. For example, iteratively calculating v components includes directly iteratively calculating a sum or a mean for each computation window respectively. Directly iteratively calculating the sum or the mean includes accessing the removed pair of data elements, the added pair of data elements and the sum or the mean. Directly iteratively calculating the sum or the mean includes removing any contribution of the removed pair of data elements from the sum or the mean mathematically. Directly iteratively calculating the sum or the mean includes adding a contribution of the added pair of data elements to the sum or the mean mathematically.

The computing system iteratively calculating one or more components of a covariance for the two adjusted computation windows include indirectly iteratively calculating w=p−v components as needed. Indirectly iteratively calculating the w components includes indirectly iteratively calculating each of the w components one by one. Indirectly iteratively calculating a component includes accessing and using one or more components other than the component itself. The one or more components may have been initialized, directly iteratively calculated, or indirectly iteratively calculated.

The computing system generates a covariance (either a sample covariance or a population covariance) as needed using one or more iteratively calculated components.

The computing system may keep receiving a pair of data elements to be added to the two computation windows, storing the received pair of data elements in the one or two data buffers, adjusting the computation windows, iteratively calculating one or more components and generating a covariance (either a sample covariance or a population covariance) as needed using one or more iteratively calculated components, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing device-readable media for carrying or storing computing device-executable instructions and/or data structures. Such computing device-readable media may be any available media that may be accessed by a general purpose or special purpose computing device. Computing device-readable media that store computing device-executable instructions are computing device storage media (devices). Computing device-readable media that carry computing device-executable instructions are transmission media. Thus, by way of example, and not limitation, embodiments of the invention may comprise at least two distinctly different kinds of computing device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing device-executable instructions or data structures and which may be accessed by a general purpose or special purpose computing device. Combinations of the above should also be included within the scope of computing device-readable media.

Further, upon reaching various computing device components, program code means in the form of computing device-executable instructions or data structures may be transferred automatically from transmission media to computing device storage media (devices) (or vice versa). For example, computing device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing device-executable instructions comprise, for example, instructions and data which, when executed at a processor, cause a general purpose computing device, special purpose computing device, or special purpose processing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, minicomputers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

Within this description and the following claims, a "circular buffer" is a data structure that uses a single, fixed-size "buffer" as if it were connected end-to-end. A circular buffer may also be referred to as a cyclic buffer or a ring buffer. The "circular buffer" may be a commonly used circular buffer which is generally a space allocated in a local memory. The "circular buffer" may also be a "virtual circular buffer" which may reside in memory or other non-transitory computer-readable media, such as a hard disk or other media, and may include multiple distributed files on multiple distributed computing devices, such as may be connected end-to-end to form a "circular buffer".

FIG. 1 illustrates a high-level overview of an example computing system 100 that facilitates iteratively calculating covariance for streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, covariance calculation module 191 and component calculation modules 131. Covariance calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
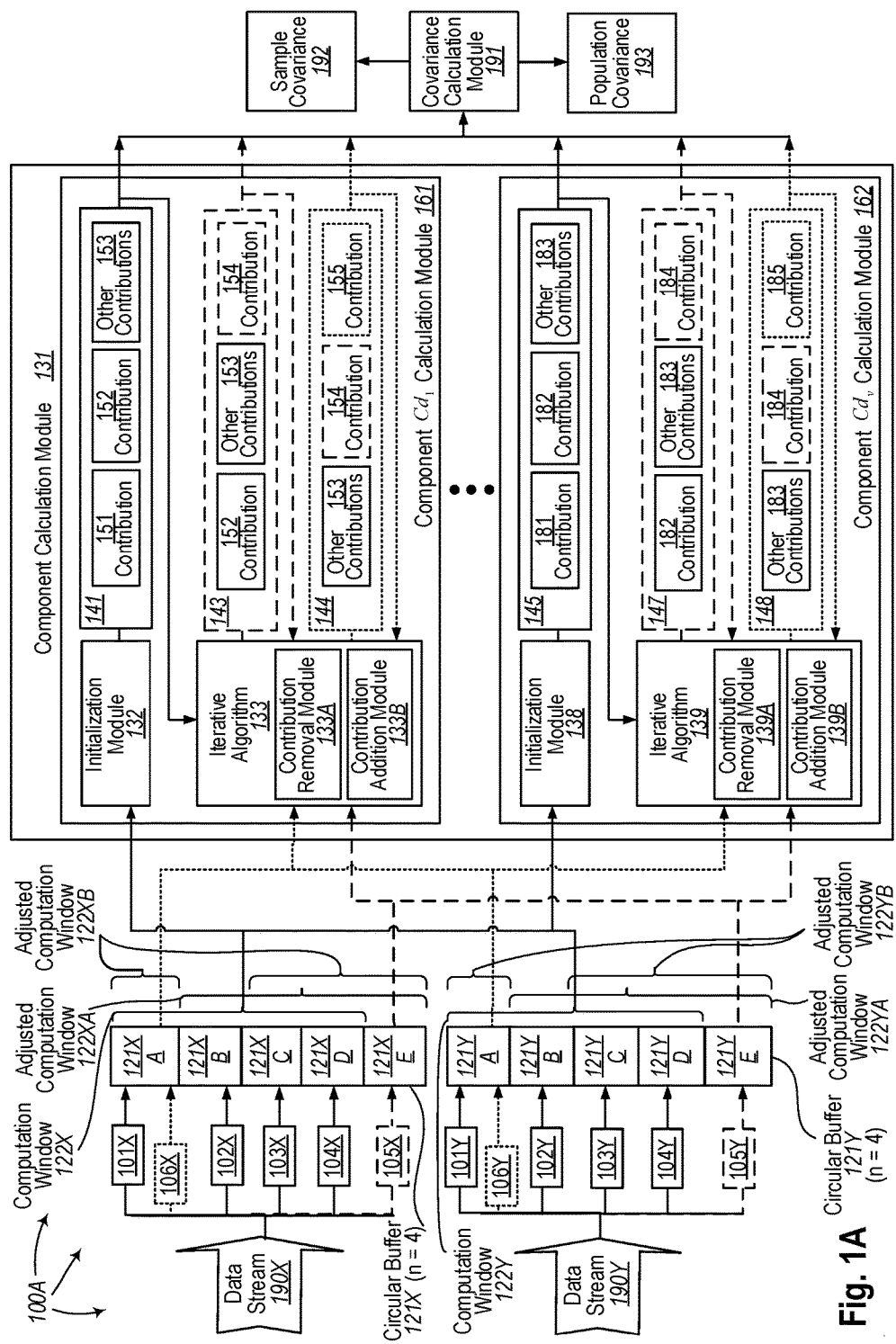
FIG. 1A illustrates an example computing device architecture that facilitates iteratively calculating a sample covariance and/or a population covariance for streamed data with two inputs with all components being directly iteratively calculated.

FIG. 1A illustrates an example computing device architecture 100A that facilitates iteratively calculating a sample covariance and/or a population covariance for streamed data with two inputs with all (v=p 1) components being directly iteratively calculated. FIG. 1A illustrates 1007 and 1006 shown in FIG. 1. Referring to FIG. 1A, computing device architecture 100A includes iterative component calculation module 131 and covariance calculation module 191. Covariance calculation module 191 may calculate either a sample covariance 192 or a population covariance 193 using one or more components. Iterative component calculation module 131 may be connected to (or is part of) a network, such as, for example, a Local Area Network ("LAN"), a Wide Area Network ("WAN"), and even the Internet. Accordingly, iterative component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 may be used as the input of covariance calculation module 191, and covariance calculation module 191 may generate sample covariance 192 and/or population covariance 193.

In general, data stream 190X and data stream 190Y may be a sequence of digitally encoded signals (e.g., packets of data or data packets) respectively used to transmit or receive information that is in the process of being transmitted. Data stream 190X and data stream 190Y may stream data elements, such as, for example, stock quotes, audio data, video data, geospatial data, web data, mobile communication data, online gaming data, banking transaction data, sensor data, closed-captioning data, etc., to computing device architecture 100A. Data stream 190X and data stream 190Y may stream stored data or be two live streams.

As pairs of streamed data elements are received, the received data elements may be placed in a location within circular buffer 121X and circular buffer 121Y respectively. For example, data element 101X may be placed in location 121XA, data element 101Y may be placed in location 121YA, data element 102X may be placed in location 121XB, data element 102Y may be placed in location 121YB, data element 103X may be placed in location 121XC, data element 103Y may be placed in location 121YC, data element 104X may be placed in location 121XD, data element 104Y may be placed in location 121YD, data element 105X may be placed in location 121XE, and data element 105Y may be placed in location 121YE.

Subsequently, data element 106X and data element 106Y may be received. Data element 106X may be placed in location 121XA (overwriting data element 101X). Data element 106Y may be placed in location 121YA (overwriting data element 101Y).

As depicted, circular buffer 121X has five locations, 121XA-121XE and a computation window X of four (i.e., n=4) and circular buffer 121Y has five locations, 121YA-121YE and a computation window Y of four (i.e., n=4). Data elements within the computation window X may rotate as received data elements are placed within circular buffer 121X. Data elements within the computation window Y may rotate as received data elements are placed within circular buffer 121Y. For example, when data element 105X is placed in location 121XE, computation window 122X is transitioned to adjusted computation window 122XA. When data element 106X is subsequently placed in location 121XA, computation window 122XA is transitioned to computation window 122XB. Similarly, when data element 105Y is placed in location 121YE, computation window 122Y is transitioned to adjusted computation window 122YA. When data element 106Y is subsequently placed in location 121YA, computation window 122YA is transitioned to adjusted computation window 122YB.

Referring to computing device architecture 100A, iterative component calculation module 131 comprises one or more (v(v=p≥1)) component calculation modules for directly iteratively calculating v components for data elements in two computation windows. The number v varies depending on which iterative algorithm is used. Referring to computing device architecture 100A, component $Cd_1$ calculation module 161 is used for calculating component $Cd_1$, and component $Cd_v$ calculation module 162 is used for calculating component $Cd_v$, and there are v−2 component calculation modules in between. Each component calculation module comprises an initialization module for initializing a component on the initial computation windows and an algorithm for iteratively calculating the component on adjusted computation windows afterwards. For example, calculation module 161 comprises initialization module 132 and iterative algorithm 133, and calculation module 162 comprises initialization module 138 and iterative algorithm 139.

Initialization module 132 is configured to calculate component $Cd_1$ for two sets of data elements in two computation windows and component calculation initialization module 138 is configured to calculate component $Cd_v$ for two sets of data elements in two computation windows. Initialization module 132 and initialization module 138 access or receive full sets of data elements (i.e., 4 pairs of data elements) from two computation windows as input. Initialization module 132 calculates component $Cd_1$ and initialization module 138 calculates component $Cd_v$ from the full sets of data elements from two computation windows. Thus, each data element contributes to the calculated components ranging from component $Cd_1$ to component $Cd_v$. Initialization module 132 may be used for an initial component $Cd_1$ calculation or when component $Cd_1$ calculations are reset. Similarly, initialization module 138 may be used for an initial component $Cd_v$ calculation or when component $Cd_v$ calculations are reset.

Iterative algorithm 133 receives a prior component $Cd_1$ value, removed pair of data elements and an added pair of data elements as input. Iterative algorithm 133 calculates a component $Cd_1$ for the two adjusted computation windows based on the prior component $Cd_1$ value, the removed pair of data elements and the added pair of data elements. Contribution removal module 133A may remove a contribution of the removed pair of data elements from the prior component $Cd_1$. Contribution addition module 133B may add a contribution of the added pair of data elements to the prior component $Cd_1$. Removing a contribution of the removed pair of data elements along with adding a contribution of the added data element may be used to calculate component $Cd_1$ for the two adjusted computation windows. Iterative algorithm 139 works in a similar way as iterative algorithm 133. Iterative algorithm 139 receives a prior component $Cd_v$ value, a removed pair of data elements and an added pair of data elements as input. Iterative algorithm 139 calculates a component $Cd_v$ for the two adjusted computation windows based on the prior component $Cd_v$ value, the removed pair of data elements and the added pair of data elements. Contribution removal module 139A may remove a contribution of the removed pair of data elements from the prior component $Cd_v$. Contribution addition module 139B may add a contribution of the added pair of data elements to the prior component $Cd_v$. Removing a contribution of the removed pair of data elements along with adding a contribution of the added pair of data elements may be used to calculate component $Cd_v$ for the two adjusted computation windows.

Covariance calculation module 191 is configured to calculate either a sample covariance 192 or a population covariance 193 on two sets of data elements in two computation windows based on the v components calculated by component calculation module 131 as input.

Figure 1B:
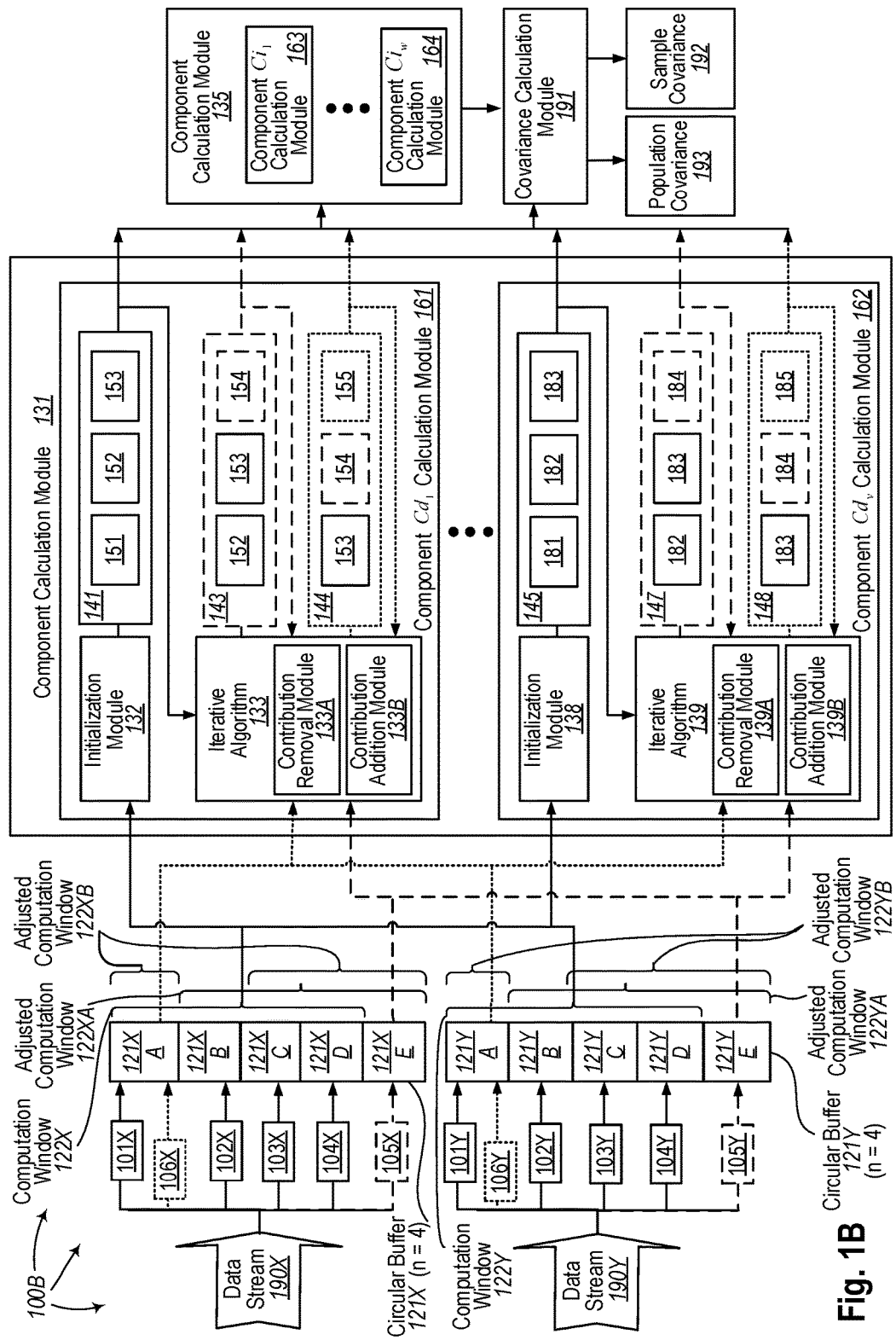
FIG. 1B illustrates an example computing device architecture that facilitates iteratively calculating a sample covariance and/or a population covariance for streamed data with two inputs with some components being directly iteratively calculated and some components being indirectly iteratively calculated.

FIG. 1B illustrates an example computing device architecture 100B that facilitates iteratively calculating a sample covariance and/or a population covariance for streamed data with two inputs with some ($v(1 \leq v < p)$) components being directly iteratively calculated and some ($w(w=p-v)$) components being indirectly iteratively calculated. In certain implementations, the difference between computing device architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing device architecture 100B also includes component calculation module 131, which also includes v component calculation modules for directly iteratively calculating v components, however the number v in 100B may not be the same number v as in 100A, because some directly iteratively calculated components in 100A are indirectly iteratively calculated in 100B. In 100A, $v=p \geq 1$, but in 100B, $1 \leq v < p$. Referring to FIG. 1B, computing device architecture 100B includes component calculation module 135. The output of components calculation module 131 may be used as the input of component calculation module 135, and the output of calculation modules 131 and 135 may be used as the input of covariance calculation module 191, and covariance calculation module 191 may generate sample covariance 192 and/or population covariance 193. Component calculation module 135 generally includes $w=p-v$ component calculation modules for indirectly iteratively calculating w components. For example, component calculation module 135 includes calculation module 163 for indirectly iteratively calculating component $Ci_1$ and calculation module 164 for indirectly iteratively calculating component $Ci_w$, and there are w-2 component calculation modules between them. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

Figure 1C:
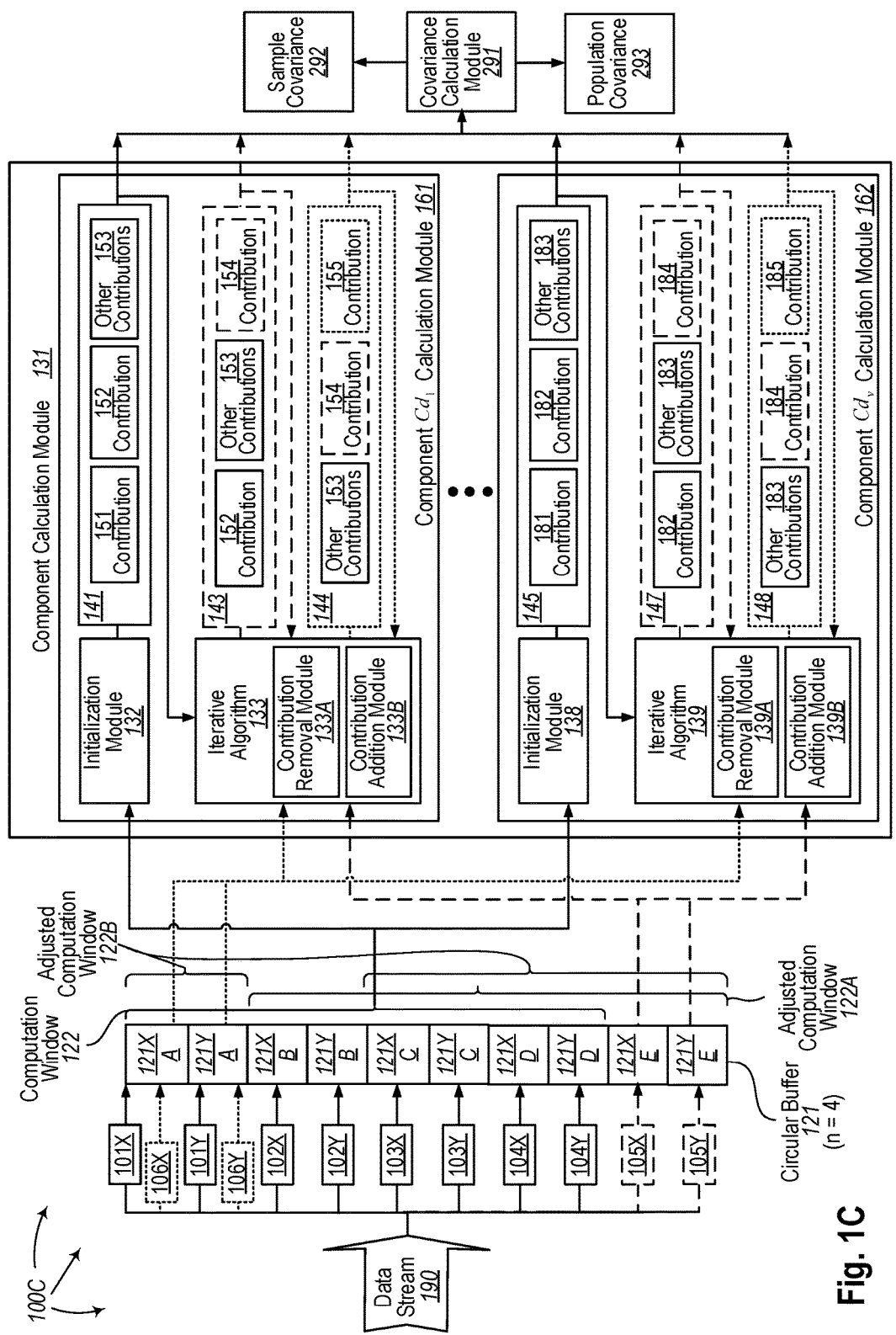
FIG. 1C illustrates an example computing device architecture that facilitates iteratively calculating a sample covariance and/or a population covariance for streamed data with a single input where data elements from two data streams are interleaved with all components being directly iteratively calculated.
Figure 1C:
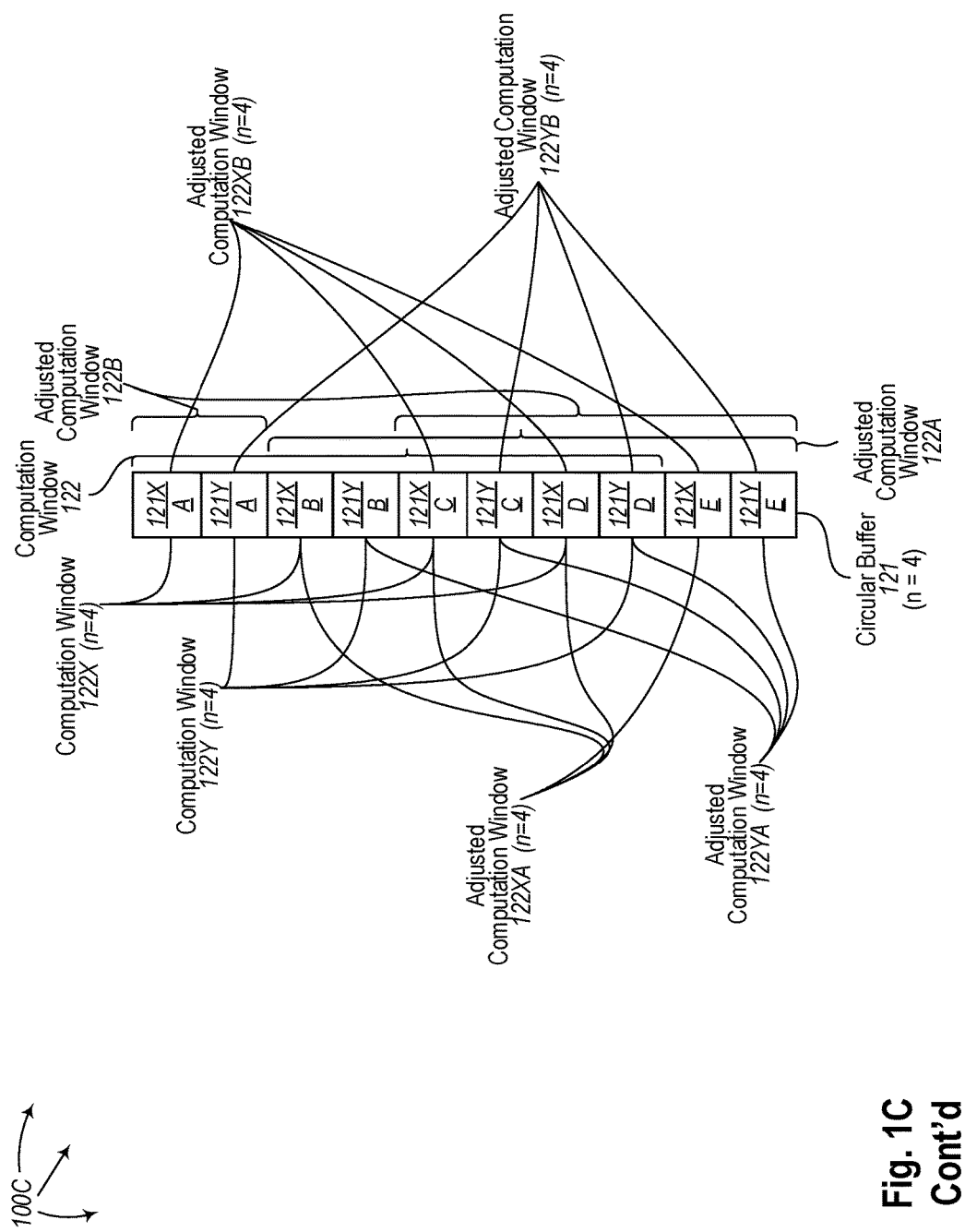

FIG. 1C illustrates an example computing device architecture 100C that facilitates iteratively calculating a sample covariance and/or a population covariance for streamed data with a single input where data elements from two data streams are interleaved with all ($v=p \geq 1$) components being directly iteratively calculated. In certain implementations, the difference between computing device architectures 100C and 100A may be that architecture 100C uses a single stream as input where two sets of data elements are interleaved and 100C uses a single circular buffer for storing data elements in two computation windows. All parts except the input mode in 100C work in a similar way as those parts with the same reference numbers in 100A. Instead of repeating what have already been explained in the description about 100A, only the different part is discussed here. Referring to FIG. 1C, data stream 190 comprises two interleaved data streams X and Y. As pairs of data elements are received, the data elements may be placed in a location within a circular buffer 121. For example, data element 101X may be placed in location 121XA, data element 101Y may be placed in location 121YA, data element 102X may be placed in location 121XB, data element 102Y may be placed in location 121YB, data element 103X may be placed in location 121XC, data element 103Y may be placed in location 121YC, data element 104X may be placed in location 121XD, data element 104Y may be placed in location 121YD, data element 105X may be placed in location 121XE, and data element 105Y may be placed in location 121YE.

Subsequently, data element 106X and data element 106Y may be received. Data element 106X may be placed in location 121XA (overwriting data element 101X). Data element 106Y may be placed in location 121YA (overwriting data element 101Y).

Figure 2:
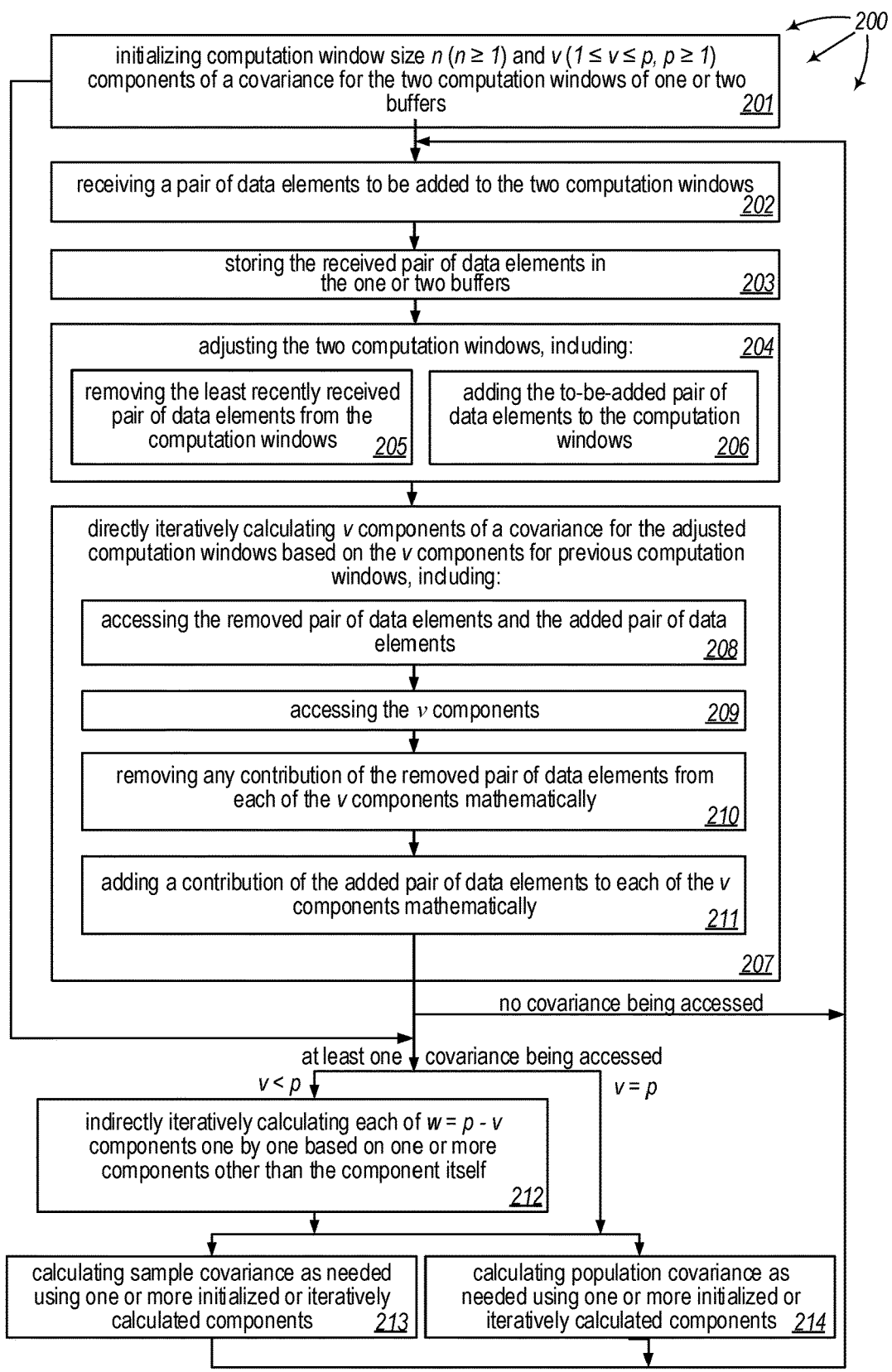
FIG. 2 illustrates a flow chart of an example method for iteratively calculating covariance for streamed data.

As depicted in FIG. 1C, circular buffer 121 has ten locations, 121XA-121YE and a computation window of eight. Computation window 122 comprises two computation windows used in covariance calculation: computation window X (n=4) and computation window Y (n=4). Data elements from computation window X and computation window Y are interleaved (as depicted in FIG. 1C Cont'd). Computation window X and computation window Y are stored in the single buffer in an interleaved way. Computation window X contains four data elements 101X, 102X, 103X and 104X and they are stored in 121XA, 121XB, 121XC and 121XD respectively. Computation window Y contains four data elements 101Y, 102Y, 103Y and 104Y and they are stored in 121YA, 121YB, 121YC and 121YD respectively. Data elements within the computation window X and the computation window Y may rotate as received pairs of data elements are placed within circular buffer 121. For example, when data element 105X is placed in location 121XE and data element 105Y is placed in location 121YE, computation window 122 is transitioned to adjusted computation window 122A. When computation window 122 is transitioned to adjusted computation window 122A, computation windows 122X and 122Y contained in computation window 122 is transitioned to adjusted computation windows 122XA and 122YA respectively at the same time (as depicted in FIG. 2 Cont'd). When data element 106X is subsequently placed in location 121XA and data element 106Y is subsequently placed in location 121YA, adjusted computation window 122A is transitioned to adjusted computation window 122B. When adjusted computation window 122A is transitioned to adjusted computation window 122B, adjusted computation windows 122XA and 122YA contained in computation window 122A is transitioned to adjusted computation windows 122XB and 122YB respectively at the same time (as depicted in FIG. 1C Cont'd).

FIG. 1C Cont'd illustrates the details about computation window 122X, adjusted computation window 122XA, adjusted computation window 122XB, computation window 122Y, adjusted computation window 122YA, and adjusted computation window 122YB. Computation window 122X contains data elements 101X, 102X, 103X and 104X that are stored in locations 121XA, 121XB, 121XC and 121XD respectively. Computation window 122Y contains data elements 101Y, 102Y, 103Y and 104Y that are stored in locations 121YA, 121YB, 121YC and 121YD respectively. Adjusted computation window 122XA contains data elements 102X, 103X, 104X and 105X that are stored in locations 121XB, 121XC, 121XD and 121XE respectively.

Adjusted computation window 122YA contains data elements 102Y, 103Y, 104Y and 105Y that are stored in locations 121YB, 121YC, 121YD and 121YE respectively. Adjusted computation window 122XB contains data elements 103X, 104X, 105X and 106X that are stored in locations 121XC, 121XD, 121XE and 121XA respectively. Adjusted computation window 122YB contains data elements 103Y, 104Y, 105Y and 106Y that are stored in locations 121YC, 121YD, 121YE and 121YA respectively.

Figure 1D:
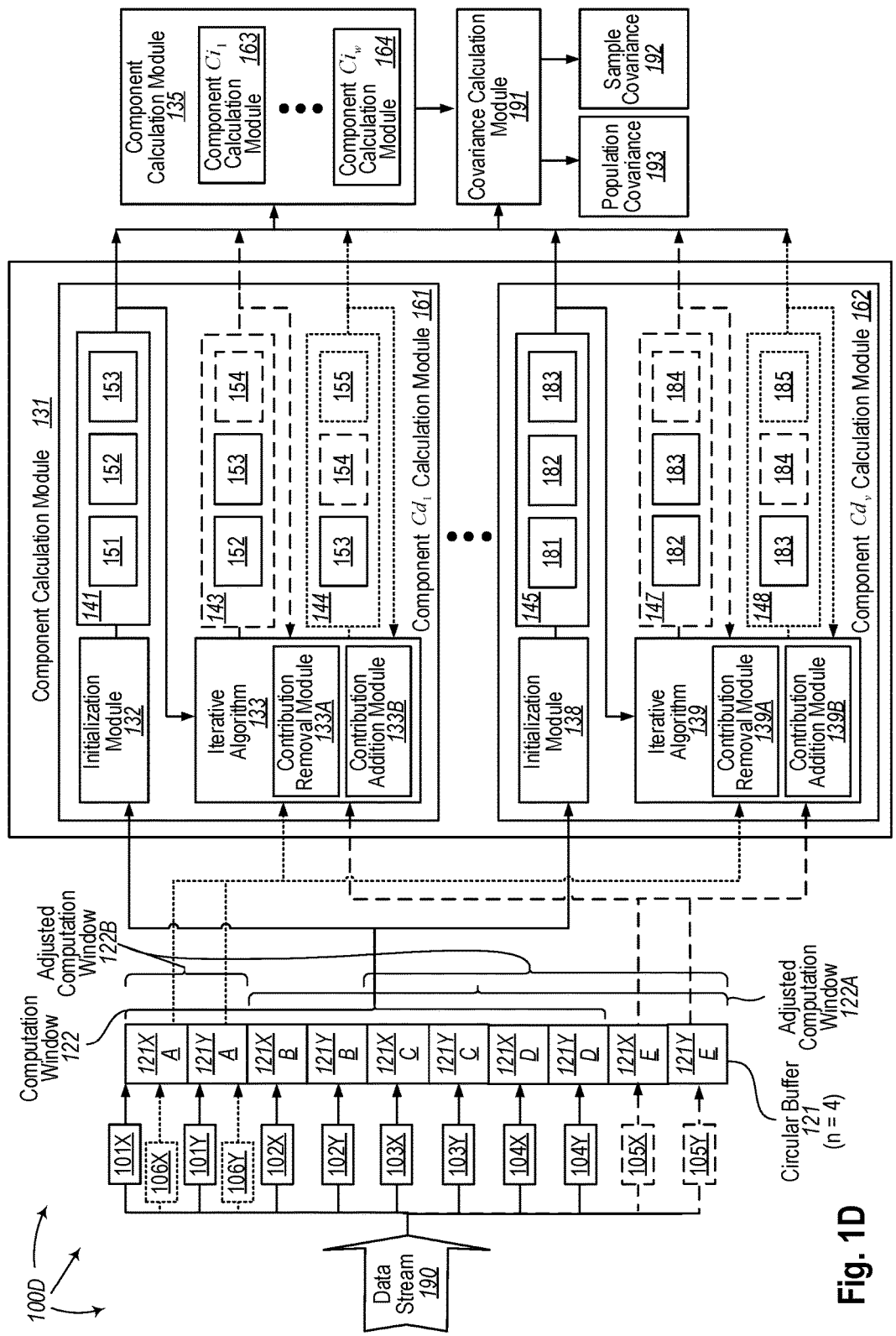
FIG. 1D illustrates an example computing device architecture that facilitates iteratively calculating a sample covariance and/or a population covariance for streamed data with a single input where data elements from two data streams are interleaved with some components being directly iteratively calculated and some components being indirectly iteratively calculated.
Figure 1D:
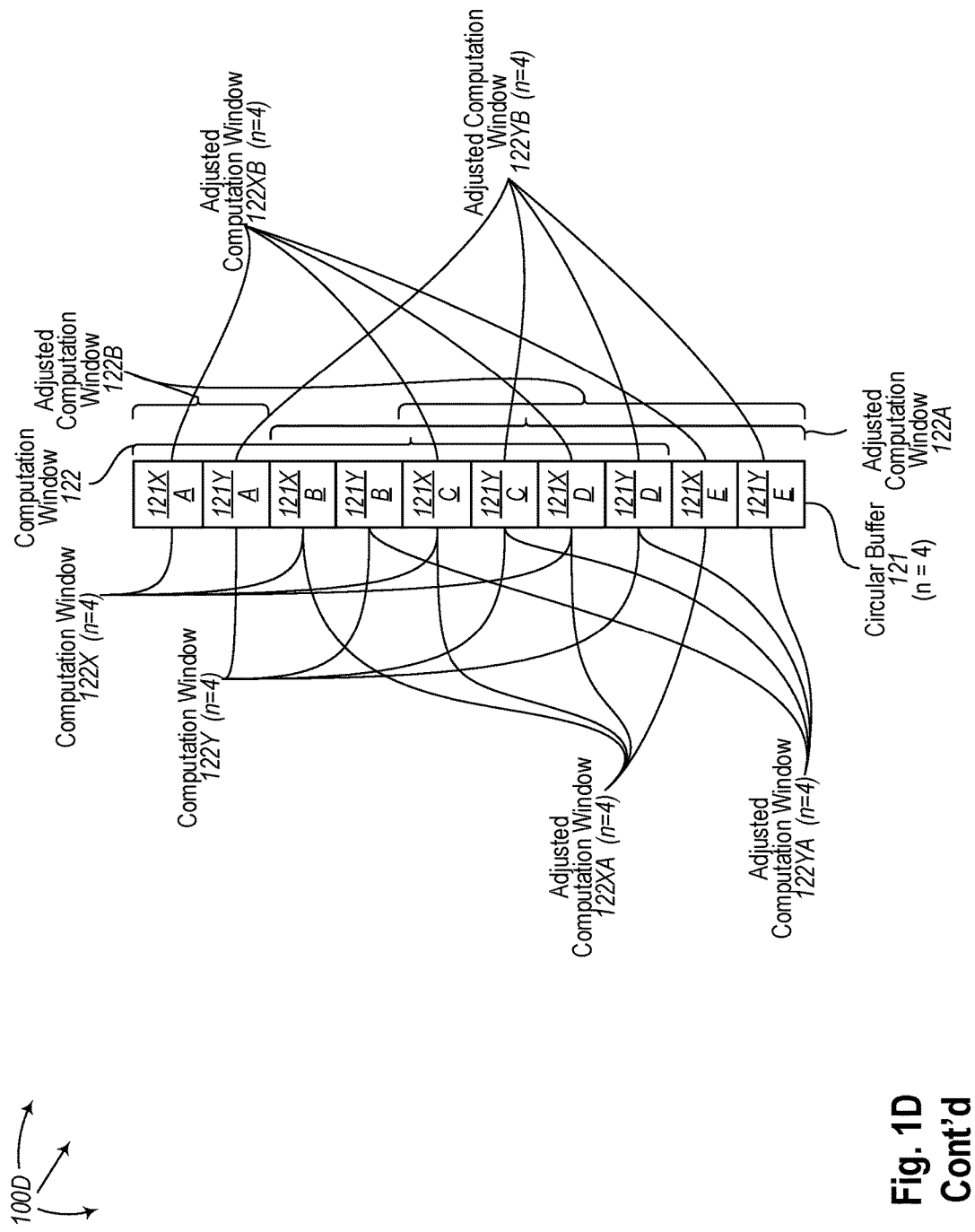

FIG. 1D illustrates an example computing device architecture 100D that facilitates iteratively calculating a sample covariance and/or a population covariance for streamed data with a single input where data elements from two data streams are interleaved with some (v(1≤v<p)) components being directly iteratively calculated and some (w(w=p−v)) components being indirectly iteratively calculated. In certain implementations, the difference between computing device architectures 100D and 100C may be that architecture 100D includes a component calculation module 135. All parts except component calculation module 135 in 100D work in a similar way as those parts with the same reference numbers in 100C. Instead of repeating what have already been explained in the descriptions about 100A and 100C respectively, only the different part is discussed here. Computing device architecture 100D also includes component calculation module 131, which also includes v component calculation modules for directly iteratively calculating v components, however the number v in 100D may not be the same number v as in 100C, because some directly iteratively calculated components in 100C are indirectly iteratively calculated in 100D. In 100C, v=p≥1, but in 100D, 1≤v<p. Referring to FIG. 1D, computing device architecture 100D includes component calculation module 135. The output of components calculation module 131 may be used as the input of component calculation module 135, and the output of calculation modules 131 and 135 may be used as the input of covariance calculation module 191, and covariance calculation module 191 may generate sample covariance 192 and/or population covariance 193. Component calculation module 135 includes w=p−v component calculation modules for indirectly iteratively calculating w components. Indirectly iteratively calculating w components includes indirectly iteratively calculating each of the w components one by one. Indirectly iteratively calculating a component includes accessing and using one or more components other than the component itself. The one or more components may have been initialized, directly iteratively calculated or indirectly iteratively calculated.

FIG. 1D Cont'd illustrates the details about computation window 122X, adjusted computation window 122XA, adjusted computation window 122XB, computation window 122Y, adjusted computation window 122YA, and adjusted computation window 122YB. Computation window 122X contains data elements 101X, 102X, 103X and 104X that are stored in locations 121XA, 121XB, 121XC and 121XD respectively. Computation window 122Y contains data elements 101Y, 102Y, 103Y and 104Y that are stored in locations 121YA, 121YB, 121YC and 121YD respectively. Adjusted computation window 122XA contains data elements 102X, 103X, 104X and 105X that are stored in locations 121XB, 121XC, 121XD and 121XE respectively. Adjusted computation window 122YA contains data elements 102Y, 103Y, 104Y and 105Y that are stored in locations 121YB, 121YC, 121YD and 121YE respectively. Adjusted computation window 122XB contains data elements 103X, 104X, 105X and 106X that are stored in locations 121XC, 121XD, 121XE and 121XA respectively. Adjusted computation window 122YB contains data elements 103Y, 104Y, 105Y and 106Y that are stored in locations 121YC, 121YD, 121YE and 121YA respectively.

FIG. 2 illustrates a flow chart of an example method 200 for iteratively calculating covariance for streamed data. Method 200 will be described with respect to the components and data of computing device architectures 100A, 100B, 100C and 100D respectively.

Method 200 includes initializing computation window size n (n≥1) and v (1≤v≤p, p≥1) components of a covariance for the two computation windows of one or two buffers (201). The one or two buffer is filled with the first n data elements from a data stream for the first two computation windows. The computing device initializes one or more components for the first two computation window one by one according to the component's definition based on the data elements in the two computation windows. For example for computing device architectures 100A, 100B, 100C and 100D, initialization module 132 may be used to calculate component $Cd_1$ 141 from pairs of data elements (101X, 101Y), (102X, 102Y), (103X, 103Y), and (104X, 104Y). As depicted, component $Cd_1$ 141 includes contribution 151, contribution 152, and other contributions 153. Contribution 151 is a contribution from a pair of data elements (101X, 101Y). Contribution 152 is a contribution from a pair of data elements (102X, 102Y). Other contributions 153 are contributions from pairs of data elements (103X, 103Y) and (104X, 104Y). Similarly, initialization module 138 may be used to calculate component $Cd_v$ 145 from pairs of data elements (101X, 101Y), (102X, 102Y), (103X, 103Y), and (104X, 104Y). As depicted, component $Cd_v$ 145 includes contribution 181, contribution 182, and other contributions 183. Contribution 181 is a contribution from a pair of data elements (101X, 101Y). Contribution 182 is a contribution from a pair of data elements (102X, 102Y). Other contributions 183 are contributions from pairs of data elements (103X, 103Y) and (104X, 104Y).

Method 200 includes receiving a pair of data elements to be added to the two computation windows (202). For example, a pair of data elements (105X, 105Y) may be received subsequent to receiving pairs of data elements (102X, 102Y), (103X, 103Y), and (104X, 104Y), which are to be added to the two computation windows. Method 200 includes storing the received pair of data elements in the one or two buffers (203). For example, for computing device architectures 100A and 100B, the pair of data elements (105X, 105Y) may be stored in location 121XE of buffer 121X and 121YE of buffer 121Y respectively, and for computing device architectures 100C and 100D, the pair of data elements (105X, 105Y) may be stored in locations 121XE and 121YE respectively of a single buffer 121.

Method 200 includes adjusting the two computation windows (204). For example, computation window 122X may be transitioned to adjusted computation window 122XA and computation window 122Y may be transitioned to adjusted computation window 122YA. Adjusting the two computation windows includes removing the least recently received pair of data elements from the two computation windows (205) and adding the to-be-added pair of data elements to the two computation windows (206). For example, data element 101X is removed from computation window 122X and data element 101Y is removed from computation window 122Y, and data element 105X is added to computation window 122X and data element 105Y is added to computation window 122Y.

Method 200 includes directly iteratively calculating v components of a covariance for the adjusted computation windows based on the v components for the previous computation windows (207). For example, iterative algorithm 133 may be used for calculating component 143 (for adjusted computation window 122A) based on component 141 (for computation window 122), and iterative algorithm 139 may be used for calculating component 147 (for adjusted computation window 122A) based on component 145 (for computation window 122).

Directly iteratively calculating the v components of a covariance for the adjusted computation windows includes accessing the removed pair of data elements and the added pair of data elements (208). For example, iterative algorithm 133 may access data elements (101X, 101Y) and (105X, 105Y), and iterative algorithm 139 may also access data elements (101X, 101Y) and (105X, 105Y).

Directly iteratively calculating the v components of a covariance for the adjusted computation windows includes accessing the v components (209). For example, iterative algorithm 133 may access component $Cd_1$ 141, and iterative algorithm 139 may access component $Cd_v$ 145.

Directly iteratively calculating one or more components of a covariance for the adjusted computation windows includes removing any contribution of the removed pair of data elements from each of the v components mathematically (210). For example, directly iteratively calculating 143 may include contribution removal module 133A removing contribution 151 (i.e., the contribution from a pair of data elements (101X, 101Y)) from component $Cd_1$ 141 mathematically, and directly iteratively calculating component $Cd_v$ 147 may include contribution removal module 139A removing contribution 181 (i.e., the contribution from a pair of data elements (101X, 101Y)) from component $Cd_v$ 145 mathematically.

Directly iteratively calculating the v components of a covariance for the adjusted computation windows includes adding a contribution of the added pair of data elements to each of the v components mathematically (211). For example, directly iteratively calculating component $Cd_1$ 143 may include contribution addition module 133B adding contribution 154 to component 141 mathematically, and directly iteratively calculating component $Cd_v$ 147 may include contribution addition module 139B adding contribution 184 to component $Cd_v$ 145 mathematically. Contribution 154 and 184 are contributions from a pair of data elements (105X, 105Y).

As depicted in FIGS. 1A, 1B, 1C and 1D, component $Cd_1$ 143 includes contribution 152 (a contribution from a pair of data elements (102X, 102Y)), other contributions 153 (contributions from pairs of data elements (103X, 103Y) and (104X, 104Y)), and contribution 154 (a contribution from a pair of data elements (105X, 105Y)). Similarly, component $Cd_v$ 147 includes contribution 182 (a contribution from a pair of data elements (102X, 102Y)), other contributions 183 (contributions from pairs of data elements (103X, 103Y) and (104X, 104Y)), and contribution 184 (a contribution from a pair of data elements (105X, 105Y)).

A covariance, either a sample covariance or a population covariance, may be calculated as needed, i.e., it may be calculated when it is accessed, though the v components must be calculated whenever a pair of data elements is removed from and a pair of data elements is added to the computation windows.

When no covariance is accessed, Method 200 includes receiving a pair of data elements to be added to the two computation windows.

When at least one covariance (a sample covariance, or a population covariance or both) is accessed and when v<p (i.e., not all components are directly iteratively calculated), Method 200 includes indirectly iteratively calculating w=p−v components one by one based on one or more components other than the component itself (212) and then calculating a covariance using one or more initialized or iteratively calculated components (213, 214). For example, referring to FIG. 1B and FIG. 1D, calculation module 163 may be used for indirectly iteratively calculating component $Ci_1$, and calculation module 164 may be used for indirectly iteratively calculating component $Ci_w$.

When at least one covariance (a sample covariance, or a population covariance or both) is accessed and when v=p (i.e., all components are directly iteratively calculated), Method 200 includes calculating either a sample covariance or a population covariance using one or more initialized or iteratively calculated components (213, 214).

Method 200 includes calculating sample covariance using one or more initialized or iteratively calculated components (213). For example, referring to computing device architectures 100A and 100C, covariance calculation module 191 may then calculate a sample covariance 192 using one or more calculated components ranging from component $Cd_1$ 143 to component $Cd_v$ 147, and referring to computing device architectures 100B and 100D, covariance calculation module 191 may then calculate a sample covariance 192 using one or more components ranging from component $Cd_1$ 143 to component $Cd_v$ 147 and component $Ci_1$ to component $Ci_w$.

Method 200 includes calculating population covariance using one or more initialized or iteratively calculated components (214). For example, referring to computing device architectures 100A and 100C, covariance calculation module 191 may then calculate a population covariance 193 using one or more components ranging from component $Cd_1$ 143 to component $Cd_v$ 147, and referring to computing device architectures 100B and 100D, covariance calculation module 191 may then calculate a population covariance 193 using one or more components ranging from component $Cd_1$ 143 to component $Cd_v$ 147 and component $Ci_1$ to component $Ci_w$.

202-211 may be repeated as additional pairs of data elements are received, and 212-214 may be repeated as needed. For example, subsequent to calculating component $Cd_1$ 143 and component $Cd_v$ 147, a pair of data elements (106X, 106Y) to be added to the two computation windows may be received (202). The pair of data elements (106X, 106Y) may be placed in location 121XA overwriting data element 101X and in location 121YA overwriting data element 101Y respectively (203). Adjusted computation window 122XA may be transitioned to adjusted computation window 122XB and adjusted computation window 122YA may be transitioned to adjusted computation window 122YB (204) by removing the least recently received pair of data elements (102X, 102Y) (205) and adding the to-be-added pair of data elements (106X, 106Y) (206).

Iterative algorithm 133 may directly iteratively calculate component $Cd_1$ 144 (for adjusted computation windows 122XB and 122YB) based on component $Cd_1$ 143 (for adjusted computation windows 122XA and 122YA) (207). Iterative algorithm 133 may access the removed pair of data elements (102X, 102Y) and the added pair of data elements (106X, 106Y) (208). Iterative algorithm 133 may access component $Cd_1$ 143 (209). Directly iteratively calculating component $Cd_1$ 144 may include contribution removal module 133A removing contribution 152 (i.e., the contribution of the removed pair of data elements (102X, 102Y)) from component $Cd_1$ 143 mathematically (210). Directly iteratively calculating component $Cd_1$ 144 may include contribution addition module 133B adding contribution 155 (i.e., the contribution from the added pair of data elements (106X, 106Y)) to component $Cd_1$ 143 mathematically (211). Similarly, iterative algorithm 139 may directly iteratively calculate component $Cd_v$ 148 (for adjusted computation windows 122XB and 122YB) based on component $Cd_v$ 147 (for adjusted computation windows 122XA and 122YA) (207). Iterative algorithm 139 may access the removed pair of data elements (102X, 102Y) and the added pair of data elements (106X, 106Y) (208). Iterative algorithm 139 may access component $Cd_v$ 147 (209). Directly iteratively calculating component $Cd_v$ 148 may include contribution removal module 139A removing contribution 182 (i.e., the contribution of the removed pair of data elements (102X, 102Y)) from component $Cd_v$ 147 mathematically (210). Directly iteratively calculating component $Cd_v$ 148 may include contribution addition module 139B adding contribution 185 (i.e., the contribution of the added pair of data elements (106X, 106Y)) to component $Cd_v$ 147 mathematically (211).

As depicted in FIGS. 1A, 1B, 1C and 1D, component $Cd_1$ 144 includes other contributions 153 (contributions for pairs of data elements (103X, 103Y) and (104X, 104Y)), contribution 154 (a contribution from the pair of data elements (105X, 105Y)), and contribution 155 (a contribution from the pair of data elements (106X, 106Y)), and component $Cd_v$ 148 includes other contributions 183 (contributions for pairs of data elements (103X, 103Y) and (104X, 104Y)), contribution 184 (a contribution from the pair of data elements (105X, 105Y)), and contribution 185 (a contribution from the pair of data elements (106X, 106Y)).

When at least one covariance (a sample covariance, or a population covariance or both) is accessed and when v<p (i.e., not all components are directly iteratively calculated), Method 200 includes indirectly iteratively calculating w=p−v components one by one based on one or more components other than the component itself (212) and then calculating a covariance using one or more initialized or iteratively calculated components (213, 214). For example, referring to FIG. 1B and FIG. 1D, calculation module 163 may be used for indirectly iteratively calculating component $Ci_1$, and calculation module 164 may be used for indirectly iteratively calculating component $Ci_w$.

When at least one covariance (a sample covariance, or a population covariance or both) is accessed and when v=p (i.e., all components are directly iteratively calculated), Method 200 includes calculating either a sample covariance or a population covariance using one or more initialized or iteratively calculated components (213, 214).

Method 200 includes calculating sample covariance using one or more initialized or iteratively calculated components (213). For example, referring to computing device architectures 100A and 100C, covariance calculation module 191 may then calculate a sample covariance 192 using one or more calculated components ranging from component $Cd_1$ 144 to component $Cd_v$ 148, and referring to computing device architectures 100B and 100D, covariance calculation module 191 may then calculate a sample covariance 192 using one or more components ranging from component $Cd_1$ 144 to component $Cd_v$ 148 and component $Ci_1$ to component $Ci_w$.

Method 200 includes calculating population covariance using one or more initialized or iteratively calculated components (214). For example, referring to computing device architectures 100A and 100C, covariance calculation module 191 may then calculate a population covariance 193 using one or more components ranging from component $Cd_1$ 144 to component $Cd_v$ 148, and referring to computing device architectures 100B and 100D, covariance calculation module 191 may then calculate a population covariance 193 using one or more components ranging from component $Cd_1$ 144 to component $Cd_v$ 148 and component $Ci_1$ to component $Ci_w$.

When a pair of data elements is received, component $Cd_1$ 144 may be used to iteratively calculate a component $Cd_1$ for the two adjusted computation windows and component $Cd_v$ 148 may be used to iteratively calculate a component $Cd_v$ for the two adjusted computation windows.

Figure 3A:
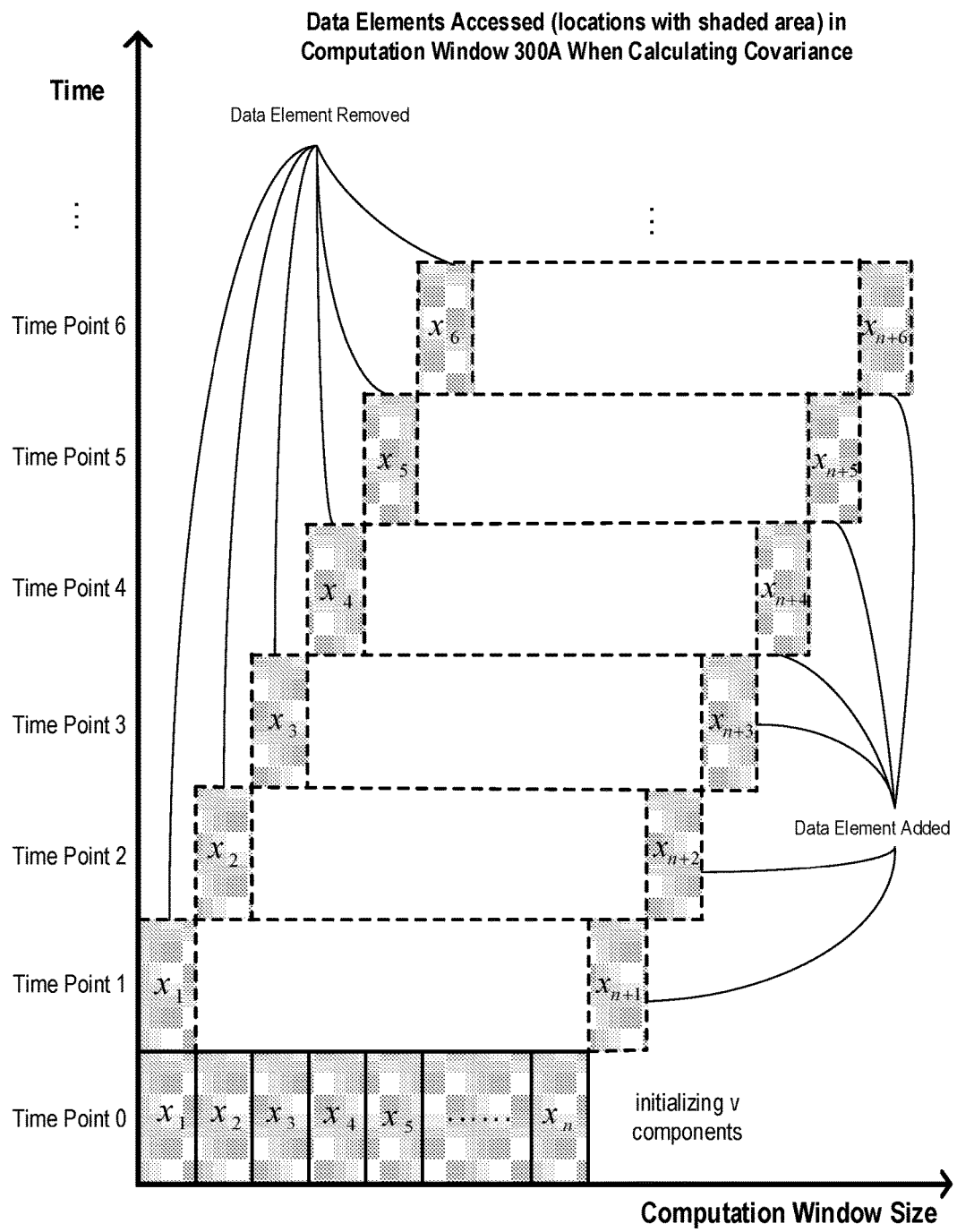
FIG. 3A illustrates data elements that are accessed from one of the two computation windows for iteratively calculating a covariance on streamed data. Data elements in the other computation window are accessed in a similar way.

FIG. 3A illustrates data elements that are accessed from, one of the two computation windows, computation window 300A for iteratively calculating a sample covariance and/or a population covariance on streamed data. Data elements in the other computation window are accessed in a similar way. The difference between a computation window and a computation subset is that the data elements in a computation window are ordered (e.g., a data element is always removed from either the left end or the right end of a computation window and a data element is always added to either the right end or the left end of a computation window). For example, referring to FIG. 3A, a least recently received data element is always removed from the left end and a to-be-added data element is always added to the right end of computation window 300A. For computation window 300A, the first n data elements are accessed for calculating one or more components (p(p=v+w)) for the first computation window and then calculating a sample covariance and/or a population covariance as needed. As time progresses, a data element removed from the computation window 300A and a data element for example, data element $x_{n+1}$, then $x_{n+2}$, then $x_{n+3}$, . . . added to the computation window 300A, are accessed for directly iteratively calculating v components, and all other data elements are not touched. The v components may be directly iteratively calculated from a removed data element, an added data element and the v components for the previous computation window. For a given iterative algorithm, v is a constant, so the number of operations for directly iteratively calculating v components is a constant, and the number of operations for indirectly iteratively calculating w=p−v components is also a constant. Thus, after calculation of the one or more components for the first computation window, computation workload is reduced and remains constant. The larger the n, the more substantial the reduction in computation workload.

Suppose computation window X composes of n data elements: X={$x_i$|i=1, . . . , n} and computation window Y composes of n data elements: Y={$y_i$|i=1, . . . , n}. Suppose both X and Y have changed after some time period, say data element $x_r$ (1≤r≤n) in X is removed and a data element $x_a$ is added to X and data element $y_r$ (1≤r≤n) in Y is removed and a data element $y_a$ is added to Y respectively. Whenever a data element is removed and a data element is added, the computation window is considered as an adjusted computation window. A new iteration of calculation is started each time any component of a covariance is recalculated due to a data change in the computation windows.

FIG. 4A illustrates equations for calculating a covariance. Equation 401 is a traditional equation for calculating a sum $XS_k$ for the $k^{th}$ iteration for computation window X. Equation 402 is a traditional equation for calculating a sum $YS_k$ for the $k^{th}$ iteration for computation window Y. Equation 403 is a traditional equation for calculating a mean $\bar{x}_k$ for the $k^{th}$ iteration for computation window X. Equation 404 is a traditional equation for calculating a mean $\bar{y}_k$ for the $k^{th}$ iteration for computation window Y. Equation 405 is a traditional equation for calculating a sample covariance for the $k^{th}$ iteration on computation windows X and Y. Equation 406 is a traditional equation for calculating a population covariance for the $k^{th}$ iteration on computation windows X and Y.

Equation 407 is an equation for calculating a sum $XS_{k+1}$ of adjusted computation window X for the $k+1^{th}$ iteration after a data element $x_r$ is removed from X and a data element $x_a$ is added to X. Equation 408 may be used for calculating a sum $YS_{k+1}$ of adjusted computation window Y for the $k+1^{th}$ iteration after a data element $y_r$ is removed from Y and a data element $y_a$ is added to Y. Equation 409 may be used for calculating a mean $\bar{x}_{k+1}$ of adjusted computation window X for the $k+1^{th}$ iteration after a data element $x_r$ is removed from X and a data element $x_a$ is added to X. Equation 410 may be used for calculating a mean $\bar{y}_{k+1}$ of adjusted computation window Y for the $k+1^{th}$ iteration after a data element $y_r$ is removed from Y and a data element $y_a$ is added to Y. Equation 411 may be used for calculating a sample covariance $Cov_s(X, Y)_{k+1}$ between adjusted computation windows X and Y for the $k+1^{th}$ iteration after $x_r$ is removed from X, $x_a$ is added to X, $y_r$ is removed from Y and $y_a$ is added to Y. Equation 412 may be used for calculating a population covariance $Cov_p(X, Y)_{k+1}$ between adjusted computation windows X and Y for the $k+1^{th}$ iteration after $x_r$ is removed from X, $x_a$ is added to X, $y_r$ is removed from Y and $y_a$ is added to Y.

FIG. 4B illustrates some example components of a covariance. A component of a covariance is a quantity or expression appearing in a covariance's definition equation or any transforms of the definition equation. The following are a few example components of a covariance.

$$XS_k = \sum_1^n x_i$$

$$YS_k = \sum_1^n y_i$$

$$\bar{x}_k = \frac{XS_k}{n} = \frac{1}{n}\sum_1^n x_i$$

$$\bar{y}_k = \frac{YS_k}{n} = \frac{1}{n}\sum_1^n y_i$$

$$SXY = \sum_1^n x_i y_i$$

$$SDXY_k = \sum_1^n (x_i - \bar{x}_k)(y_i - \bar{y}_k)$$

$$Cov_s(X, Y)_k = \frac{1}{n-1}\sum_1^n (x_i - \bar{x}_k)(y_i - \bar{y}_k) \text{ for a sample covariance}$$

$$Cov_p(X, Y)_k = \frac{1}{n}\sum_1^n (x_i - \bar{x}_k)(y_i - \bar{y}_k) \text{ for a population covariance}$$

$SDXY_k$, $\bar{x}_k$, and $\bar{y}_k$ are components of a covariance because they directly appear in the definition of a covariance. $SXY_k$, $XS_k$ and $YS_k$ are also components of a covariance because they appear in a transform expression of a covariance. Even the sample covariance $$Cov_s(X, Y)_k = \frac{1}{n-1}\sum_1^n (x_i - \bar{x}_k)(y_i - \bar{y}_k)$$

itself is considered as a component because it is the largest component appearing in the definition of a sample covariance. Similarly, $$Cov_p(X, Y)_k = \frac{1}{n}\sum_1^n (x_i - \bar{x}_k)(y_i - \bar{y}_k)$$

is also a component of a population covariance. A covariance may be calculated based on one or more its components or combinations of them. For example, if $$SDXY_k = \sum_1^n (x_i - \bar{x}_k)(y_i - \bar{y}_k)$$

is known, either a sample covariance or a population covariance may be calculated. If each required component may be iteratively calculated, then a covariance may be iteratively calculated. The number of components to be used varies depending on a specific incremental covariance calculation algorithm chosen. Since multiple components of a covariance and even more combinations of the components exist, there are multiple ways (algorithms) supporting iterative covariance calculation. To illustrate how to use components to iteratively calculate covariance, three different iterative covariance calculation algorithms are presented as examples later. A sum $$\sum_1^n x_i \text{ or a mean } \frac{1}{n}\sum_1^n x_i$$

is a component to be used in the example iterative covariance algorithms, so four equations for iteratively calculating a sum or a mean of adjusted computation window X and Y respectively are illustrated in FIG. 4B instead of in each example algorithm. Equation 413 may be used for iteratively calculating a sum $XS_{k+1}$ of adjusted computation window X for the $k+1^{th}$ iteration when the sum $XS_k$ of computation window X for the $k^{th}$ iteration is known. Equation 413 adds contributions of $x_a$ to $XS_k$ mathematically and removes contributions of $x_r$ from $XS_k$ mathematically to get $XS_{k+1}$. Equation 414 may be used for iteratively calculating a sum $YS_{k+1}$ of adjusted computation window Y for the $k+1^{th}$ iteration when the mean $YS_k$ of computation window Y for the $k^{th}$ iteration is known. Equation 414 adds contributions of $y_a$ to $YS_k$ mathematically and removes contributions of $y_r$ from $YS_k$ mathematically to get $YS_{k+1}$. Equation 415 may be used for iteratively calculating a mean $\bar{x}_{k+1}$ of adjusted computation window X for the $k+1^{th}$ iteration when the mean $\bar{x}_k$ of computation window X for the $k^{th}$ iteration is known. Equation 415 adds contributions of $x_a$ to $\bar{x}_k$ mathematically and removes contributions of $x_r$ from $\bar{x}_k$ mathematically to get $\bar{x}_{k+1}$. Equation 416 may be used for iteratively calculating a mean $\bar{y}_{k+1}$ of adjusted computation window Y for the $k+1^{th}$ iteration when the mean $\bar{y}_k$ of computation window Y for the $k^{th}$ iteration is known. Equation 416 adds contributions of $y_a$ to $\bar{y}_k$ mathematically and removes contributions of $y_r$ from $\bar{y}_k$ mathematically to get $\bar{y}_{k+1}$.

FIG. 4C illustrates the first example iterative covariance calculation algorithm (iterative algorithm 1) for iteratively calculating a sample covariance based on iteratively calculated sample covariance and another pair of components $XS_{k+1}$ or $\bar{x}_{k+1}$ and $YS_k$ or $\bar{y}_k$, or $XS_k$ or $\bar{x}_k$ and $YS_{k+1}$ or $y_{k+1}$ and iteratively calculating a population covariance based on iteratively calculated population covariance and another pair of components $XS_{k+1}$ or $\bar{x}_{k+1}$ and $YS_k$ or $\bar{y}_k$, or $XS_k$ or $\bar{x}_k$ and $YS_{k+1}$ or $\bar{y}_{k+1}$. Equation 413 and equation 414 may be used for iteratively calculating a sum $XS_{k+1}$ and a sum $YS_{k+1}$ for the k+1$^{th}$ iteration based on a sum $XS_k$ and a sum $YS_k$ known for the k$^{th}$ iteration respectively. Equation 415 and equation 416 may be used for iteratively calculating a mean $\bar{x}_{k+1}$ and a mean $\bar{y}_{k+1}$ for the k+1$^{th}$ iteration based on a mean $\bar{x}_k$ and a mean $\bar{y}_k$ known for the k$^{th}$ iteration respectively. Equations 417 may be used for iteratively calculate a sample covariance $Cov_s(X, Y)_{k+1}$ on the two adjusted computation windows X and Y once components $Cov_s(X, Y)_k$, $XS_{k+1}$ or $\bar{x}_{k+1}$ and $YS_k$ or $\bar{y}_k$, or $XS_k$ or $\bar{x}_k$ and $YS_{k+1}$ or $y_{k+1}$ are calculated. Equations 417 remove contributions of $x_r$ and $y_r$ from $Cov_s(X, Y)_k$ mathematically and add contributions of $x_a$ and $y_a$, to $Cov_s(X, Y)_k$ mathematically to get $Cov_s(X, Y)_{k+1}$. Equations 417 comprise multiple equations but only one of them is needed depending on if a sum or a mean or both are available. Equations 418 may be used for iteratively calculate a population covariance $Cov_p(X, Y)_{k+1}$ on the two adjusted computation windows X and Y once components $Cov_p(X, Y)_k$, $XS_{k+1}$ or $\bar{x}_{k+1}$ and $YS_k$ or $\bar{y}_k$, or $XS_k$ or $\bar{x}_k$ and $YS_{k+1}$ or $\bar{y}_{k+1}$ are calculated. Equations 418 remove contributions of $x_r$ and $y_r$ from $Cov_p(X, Y)_k$ mathematically and add contributions of $x_a$ and $y_a$, to $Cov_p(X, Y)_k$ mathematically to get $Cov_p(X, Y)_{k+1}$. Equations 418 comprise multiple equations but only one of them is needed depending on if a sum or a mean or both are available.

FIG. 4D illustrates the second example iterative covariance calculation algorithm (iterative algorithm 2) for iteratively calculating a sample covariance and a population covariance based on iteratively calculated components $XS_{k+1}$ or $\bar{x}_{k+1}$ and $YS_k$ or $\bar{y}_k$, or $XS_k$ or $\bar{x}_k$ and $YS_{k+1}$ or $\bar{y}_{k+1}$, and $SDXY_{k+1}$. Equation 413 and equation 414 may be used for iteratively calculating a sum $XS_{k+1}$ and a sum $YS_{k+1}$ for the k+1$^{th}$ iteration based on a sum $XS_k$ and a sum $YS_k$ known for the k$^{th}$ iteration respectively. Equation 415 and equation 416 may be used for iteratively calculating a mean $\bar{x}_{k+1}$ and a mean $\bar{y}_{k+1}$ for the k+1$^{th}$ iteration based on a mean $\bar{x}_k$ and a mean $\bar{y}_k$ known for the k$^{th}$ iteration respectively. Equations 419 may be used for iteratively calculating $SDXY_{k+1}$ once components $XS_{k+1}$ or $\bar{x}_{k+1}$ and $YS_k$ or $\bar{y}_k$, or $XS_k$ or $\bar{x}_k$ and $YS_{k+1}$ or $\bar{y}_{k+1}$, and $SDXY_k$ are calculated. Equations 419 remove contributions of $x_r$ and $y_r$ from $SDXY_k$ mathematically and add contributions of $x_a$ and $y_a$ to $SDXY_k$ mathematically to get $SDXY_{k+1}$. Equations 419 comprise multiple equations but only one of them is needed depending on if a sum or a mean or both are available. Once $SDXY_{k+1}$ is calculated, equation 420 may then be used for calculating a sample covariance $Cov_s(X, Y)_{k+1}$ and equation 421 may be used for calculating a population covariance $Cov_p(X, Y)_{k+1}$.

FIG. 4E illustrates the third iterative covariance calculation algorithm (iterative algorithm 3) for iteratively calculating a sample covariance and a population covariance based on iteratively calculated components $XS_{k+1}$ or $\bar{x}_{k+1}$ and $YS_{k+1}$ or $\bar{y}_{k+1}$, and $SXY_k$. Equation 413 and equation 414 may be used for iteratively calculating a sum $XS_{k+1}$ and a sum $YS_{k+1}$ for the k+1$^{th}$ iteration based on a sum $XS_k$ and a sum $YS_k$ known for the k$^{th}$ iteration respectively. Equation 415 and equation 416 may be used for iteratively calculating a mean $\bar{y}_{k+1}$ and a mean $\bar{y}_{k+1}$ for the k+1$^{th}$ iteration based on a mean $\bar{x}_k$ and a mean $\bar{y}_k$ known for the k$^{th}$ iteration respectively. Equation 422 is a traditional equation for calculating $SXY_k = \Sigma_1^n x_i y_i$ for the k$^{th}$ iteration on computation windows X and Y. Equation 423 is a traditional equation for calculating $SXY_{k+1}$ for the k+1$^{th}$ iteration on adjusted computation window X where a data element $x_r$ is removed and a data element $x_a$ is added and adjusted computation window Y where a data element $y_r$ is removed and a data element $y_a$ is added. Equation 424 may be used for iteratively calculating $SXY_{k+1}$ for the k+1$^{th}$ iteration on adjusted computation window X where a data element $x_r$ is removed and a data element $x_a$ is added and adjusted computation window Y where a data element $y_r$ is removed and a data element $y_a$ is added assuming $SXY_k$ is known. Equation 424 adds contributions of $x_a$ and $y_a$ to $SXY_k$ mathematically and removes contributions of $x_r$ and $y_r$ from $SXY_k$ mathematically to get $SXY_{k+1}$. Once component $SXY_{k+1}$ is calculated, equation 425 may then be used for calculating a sample covariance $Cov_s(X, Y)_{k+1}$ and equation 426 may be used for calculating a population covariance $Cov_p(X, Y)_{k+1}$.

To demonstrate iterative covariance calculation algorithms and their comparison against traditional algorithms, three examples are given below. Three pairs of computation windows of data elements are used. For traditional algorithms, the calculations for all three pairs of computation windows are exactly the same. For iterative algorithms, initialization of one or more components is performed for the first pair of computation windows, and iterative calculations are performed for the second and third pairs of computation windows.

FIG. 5A illustrates an example of calculating a sample covariance for X Data Stream 501 and Y Data Stream 502 using traditional algorithms. X computation window 505 is a computation window of X Data Stream 501. X computation window size 503 (n) is 4. Y computation window 506 is a computation window of Y Data Stream 502. Y computation window size 504 (n) is 4. Firstly, a mean $\bar{x}_1$ is calculated for X computation window and a mean $\bar{y}_1$ is calculated for Y computation window respectively. Then use equation 405 to calculate $Cov_s(X, Y)_1$ based on each data elements in the computation windows and $\bar{x}_1$ and $\bar{y}_1$. For example, for X computation window 505 the mean $\bar{x}_1$ is calculated to be 4.5. Calculating the mean $\bar{x}_1$ includes 1 division operation and 3 addition operations. Similarly, for Y computation window 506 the mean $\bar{y}_1$ is calculated to be 5. Calculating the mean $\bar{y}_1$ includes 1 division operation and 3 addition operations. Then, $Cov_s(X, Y)_1$ is calculated to be 7.3333333333333333 using the two means $\bar{x}_1$ and $\bar{y}_1$ and the data elements in X computation window 505 and Y computation window 506. Calculating $Cov_s(X, Y)_1$ includes 1 division, 4 multiplications, 3 additions and 9 subtractions. Thus, there are a total of 3 divisions, 4 multiplications, 9 additions and 9 subtractions when calculating said covariance.

The same equations and steps used in calculating the sample covariance $Cov_s(X, Y)_1$ for X computation window 505 and Y computation window 506 may be used to calculate a sample covariance $Cov_s(X, Y)_2$ for X computation window 507 and Y computation window 508. Since there is no change on the computation window size, equations and steps are also 3 divisions, 4 multiplications, 9 additions and 9 subtractions when calculating $Cov_s(X, Y)_2$. $Cov_s(X, Y)_2$ is calculated to be 1.6666666666666667.

X computation window 509 is a computation window of X Data Stream 501. X computation window 509 contains the data elements in X computation window 507 but removed a data element $x_r$ and added a data element $x_a$. The computation window size stays the same. X computation window size 503 (n) is 4. Y computation window 510 is a computation window of Y Data Stream 502. Y computation window 510 contains the data elements in Y computation window 508 but removed a data element $y_r$ and added a data element $y_a$. The computation window size stays the same. Y computation window size 504 (n) is 4.

The same equations and steps used in calculating the sample covariance $Cov_s(X, Y)_2$ for X computation window 507 and Y computation window 508 may be used to calculate a sample covariance $Cov_s(X, Y)_3$ for X computation window 509 and Y computation window 510. Since there is no change on the computation window size, equations and steps, there are also 3 divisions, 4 multiplications, 9 additions and 9 subtractions when calculating $Cov_s(X, Y)_3$. $Cov_s(X, Y)_3$ is calculated to be 3.75.

For two computation windows each of n data elements, traditional covariance calculation algorithms typically use 3 divisions, n multiplications, 3(n−1) additions and 2n+1 subtractions when calculating sample covariance without any optimization.

FIG. 5B illustrates an example of calculating a sample covariance using iterative algorithm 1. A mean instead of a sum is used in the example. The calculations for calculating a covariance $Cov_s(X, Y)_1$ for X computation window 505 and Y computation window 506 are essentially the same as using traditional algorithms shown in FIG. 5A. There are a total of 3 divisions, 4 multiplications, 9 additions, and 9 subtractions for calculating the sample covariance $Cov_s(X, Y)_1$.

However, for computation window 507 and computation window 508, a covariance $Cov_s(X, Y)_2$ may be iteratively calculated based on $\bar{x}_1$, $\bar{y}_1$ and $Cov_s(X, Y)_1$ calculated in the previous iteration. Equations 415 and 416 may be used for iteratively calculating the means $\bar{x}_2$ and $\bar{y}_2$ using previously calculated $\bar{x}_1$ and $\bar{y}_1$ respectively. Calculating $\bar{x}_2$ includes 1 division, 1 addition and 1 subtraction. Calculating $\bar{y}_2$ includes 1 division, 1 addition and 1 subtraction. Equations 417 may be used for iteratively calculating the sample covariance $Cov_s(X, Y)_2$. Calculating sample covariance $Cov_s(X, Y)_2$ using equation 417 includes 1 division, 2 multiplications, 2 additions, and 5 subtractions. Thus, the total operations include 3 divisions, 2 multiplications, 4 additions, and 7 subtractions for calculating the sample covariance $Cov_s(X, Y)_2$.

Equations 415, 416 and 417 may also be may also be used for iteratively calculating the sample covariance $Cov_s(X, Y)_3$ for X computation window 509 and Y computation window 510. These calculations also include 3 divisions, 2 multiplications, 4 additions, and 7 subtractions for calculating the sample covariance $Cov_s(X, Y)_3$. As such, the number of operations used when iteratively calculating the covariance is (potentially substantially) less than when using traditional equations.

FIG. 5C illustrates an example of calculating a sample covariance using iterative algorithm 2. The calculations for calculating a sample covariance $Cov_s(X, Y)_1$ for X computation window 505 and Y computation window 506 are not iterative because no previous computing results may be reused. Equation 403 may be used for calculating a mean $\bar{x}_1$ for X computation window 505. Calculating $\bar{x}_1$ includes 1 division and 3 additions. Equation 404 may be used for calculating a mean $\bar{y}_1$ for Y computation window 506. Calculating $\bar{y}_1$ includes 1 division and 3 additions. Calculating $SDXY_1$ includes 4 multiplications, 3 additions and 8 subtractions. Equation 405 may be used for calculating the sample covariance $Cov_s(X, Y)_1$ once $SDXY_1$ is calculated. Calculating $Cov_s(X, Y)_1$ using equation 405 includes 1 division and 1 subtraction. Thus, there are a total of 3 divisions, 4 multiplications, 9 additions, and 9 subtractions for calculating the sample covariance $Cov_s(X, Y)_1$.

However, for X computation window 507 and Y computation window 508, a sample covariance $Cov_s(X, Y)_2$ may be calculated iteratively based on components $x_1$, $y_1$ and $SDXY_1$ calculated in the previous iteration. Equations 415 and 416 may be used for iteratively calculating the means $\bar{x}_2$ and $\bar{y}_2$ using previously calculated $\bar{x}_1$ and $\bar{y}_1$ respectively. Calculating $\bar{x}_2$ includes 1 division, 1 addition and 1 subtraction. Calculating $\bar{y}_2$ includes 1 division, 1 addition and 1 subtraction. Equation 419 may be used for iteratively calculating $SDXY_2$ based on previously calculated $SDXY_1$. Calculating $SDXY_2$ includes 2 multiplications, 2 additions and 4 subtractions. Equation 420 may be used for calculating the sample covariance $Cov_s(X, Y)_2$ based on the iteratively calculated $SDXY_2$. Calculating $Cov_s(X, Y)_2$ using equation 420 includes 1 division and 1 subtraction. Thus, the total operations include 3 divisions, 2 multiplications, 4 additions, and 7 subtractions for calculating the sample covariance $Cov_s(X, Y)_2$. $Cov_s(X, Y)_2$ is calculated to be 1.6666666666666667 by iterative algorithm 2 which is the same as the $Cov_s(X, Y)_2$ calculated based on traditional algorithms (see FIG. 5A Cont'd 1).

Equations 415, 416, 419 and 420 may also be used for iteratively calculating the sample covariance $Cov_s(X, Y)_3$ for X computation window 509 and Y computation window 510. These calculations also include 3 divisions, 2 multiplications, 4 additions, and 7 subtractions for calculating the sample covariance $Cov_s(X, Y)_3$. $Cov_s(X, Y)_3$ is calculated to be 3.75 by iterative algorithm 2, which is the same as the $Cov_s(X, Y)_3$ calculated by traditional algorithms (see FIG. 5A Cont'd 2). As such, the number of operations used when iteratively calculating the sample covariance is (potentially substantially) less than when using traditional algorithms.

FIG. 5D illustrates an example of calculating a sample covariance using iterative algorithm 3. The calculations for calculating a sample covariance $Cov_s(X, Y)_1$ for X computation window 505 and Y computation window 506 are not iterative because no previous computing results may be reused. Equation 403 may be used for calculating a mean $\bar{x}_1$ for X computation window 505. Calculating $\bar{x}_1$ includes 1 division and 3 additions. Equation 404 may be used for calculating a mean $\bar{y}_1$ for Y computation window 506. Calculating $\bar{y}_1$ includes 1 division and 3 additions. Equation 422 may be used for calculating $SXY_1$ for X computation window 505 and Y computation window 506. Calculating $SXY_1$ includes 4 multiplications and 3 additions. Equation 405 may be used for calculating the sample covariance $Cov_s(X, Y)_1$ once $\bar{x}_1$ and $\bar{y}_1$ are calculated. Calculating $Cov_s(X, Y)_1$ using equation 405 includes 1 division, 4 multiplications, 3 additions and 9 subtractions. Thus, there are a total of 3 divisions, 8 multiplications, 12 additions, and 9 subtractions for calculating the sample covariance $Cov_s(X, Y)_1$.

However, for computation window 507 and computation window 508, a sample covariance $Cov_s(X, Y)_2$ may be calculated iteratively based on components $\bar{x}_1$, $\bar{y}_1$, and $SXY_1$ calculated in the previous iteration. Equations 415 and 416 may be used for iteratively calculating the means $\bar{x}_2$ and $\bar{y}_2$ using previously calculated $\bar{x}_1$ and $\bar{y}_1$ respectively. Calculating $\bar{x}_2$ includes 1 division, 1 addition and 1 subtraction.

Calculating $\bar{y}_2$ includes 1 division, 1 addition and 1 subtraction. Equations 424 may be used for iteratively calculating $SXY_2$ based on previously calculated $SXY_1$. Calculating $SXY_2$ includes 2 multiplications, 1 addition and 1 subtraction. Equation 425 may be used for calculating the sample covariance $Cov_s(X, Y)_2$ based on the iteratively calculated components $\bar{x}_2$, $\bar{y}_2$, and $SXY_2$. Calculating $Cov_s(X, Y)_2$ using equation 425 includes 1 division, 2 multiplications, and 2 subtractions. Thus, the total operations include 3 divisions, 4 multiplications, 3 additions, and 5 subtractions for calculating the sample covariance $Cov_s(X, Y)_2$. $Cov_s(X, Y)_2$ is calculated to be 1.666666666666667 by iterative algorithm 3, which is the same as the $Cov_s(X, Y)_2$ calculated based on traditional algorithms (see FIG. 5A Cont'd 1).

Equations 415, 416, 424 and 425 may also be used for iteratively calculating the sample covariance $Cov_s(X, Y)_3$ for X computation window 509 and Y computation window 510. These calculations also include 3 divisions, 4 multiplications, 3 additions, and 5 subtractions for calculating the sample covariance $Cov_s(X, Y)_3$. $Cov_s(X, Y)_3$ is calculated to be 3.75 by iterative algorithm 3, which is the same as the $Cov_s(X, Y)_3$ calculated by traditional algorithms (see FIG. 5A Cont'd 2). As such, the number of operations used when iteratively calculating the sample covariance is (potentially substantially) less than when using traditional algorithms.

FIGS. 5A-5D give examples for calculating sample variance. Similar calculations for population covariance may also be demonstrated.

FIG. 6 illustrates computational loads for traditional sample covariance algorithm and iterative sample covariance algorithms for n=4. As depicted, there are fewer multiplication operations, fewer addition operations, and fewer subtraction operations using any one of the iterative algorithms.

FIG. 7 illustrates computational loads for traditional sample covariance algorithm and iterative sample covariance algorithms for n=1,000,000. As depicted, there are substantially fewer multiplication operations, fewer addition operations, and fewer subtraction operations using any one of the iterative algorithms.

Similar differences in computational loads may be demonstrated for population covariance as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for calculating a covariance for two adjusted computation windows on a computing-device-based computing system which comprises one or more computing devices and one or more storage media, each of the one or more computing devices comprising one or more processors, the method comprising:

initializing, by the computing-device-based computing system, a sum or a mean or both for each of two pre-adjusted computation windows and one or more other components of a covariance for the two pre-adjusted computation windows wherein the two pre-adjusted computation windows contain a specified number n (n≥6) pairs of data elements of one or two data buffers which are on at least one of the one or more storage media and for storing data elements from one or two data streams;

receiving, by the computing-device-based computing system, a pair of data elements to be added to the two pre-adjusted computation windows;

storing, by the computing-device-based computing system, the received pair of data elements in the one or two buffers;

adjusting, by the computing-device-based computing system, the two pre-adjusted computation windows by:

removing a least recently received pair of data elements from the two pre-adjusted computation windows; and adding the to-be-added pair of data elements to the two pre-adjusted computation windows;

iteratively deriving, by the computing-device-based computing system, a sum or a mean or both for each of the two adjusted computation windows;

directly iteratively deriving, by the computing-device-based computing system and based at least in part on the one or more components other than a sum and a mean for the two pre-adjusted computation windows, one or more components of a covariance other than a sum and a mean for the two adjusted computation windows, wherein the directly iteratively deriving includes:

accessing the removed pair of data elements and the added pair of data elements without accessing all data elements in the two adjusted computation windows to reduce data accessing latency thereby saving computing resources and reducing the computing system's power consumption;

accessing the one or more components other than a sum and a mean; and removing any contribution of the removed pair of data elements from each of the accessed components mathematically and adding any contribution of the added pair of data elements to each of the accessed components mathematically wherein not all data elements in the two adjusted computation windows are used during the iteratively deriving one or more components to reduce operations performed by the computing system thereby increasing calculation efficiency; and generating, by the computing-device-based computing system, the covariance for the two adjusted computation windows based on one or more of the iteratively derived components.

2. The computing-system-implemented method of claim 1, wherein the generating the covariance further comprises indirectly iteratively deriving, by the computing-device-based computing system, one or more components of the covariance for the two adjusted computation windows, wherein the indirectly iteratively deriving of the one or more components includes individually calculating each respective one of the one or more components based on one or more components other than the respective one component.

3. The computing-system-implemented method of claim 1, wherein the generating the covariance for the two adjusted computation windows includes-generating a sample covariance for the two adjusted computation windows.

4. The computing-system-implemented method of claim 1, wherein the generating the covariance for the two adjusted computation windows includes generating a population covariance for the two adjusted computation windows.

5. The computing-system-implemented method of claim 1, wherein the storing the received pair of data elements in the one or two buffers comprises storing the received pair of data elements in one or two circular buffers.

29

6. The computing-system-implemented method of claim 1, wherein receiving a pair of data elements includes receiving a plurality of z pairs of data elements, and wherein the method further comprises iteratively performing, for each of the respective z pairs of data elements, the storing the received pair of data elements in the one or two data buffers, the adjusting the two pre-adjusted computation windows, the iteratively deriving a sum or a mean or both for each of the two adjusted computation windows, the directly iteratively deriving one or more components of a covariance other than a sum and a mean for the two adjusted computation windows, and the generating the covariance for the two adjusted computation windows.

7. The computing-system-implemented method of claim 6, wherein the generating the covariance for the two adjusted computation windows comprises generating the covariance for the two adjusted computation windows only when the covariance is accessed.

8. The computing-system-implemented method of claim 7, wherein the generating the covariance for the two adjusted computation windows further comprises indirectly iteratively deriving, by the computing-device-based computing system, one or more components of the covariance for the two adjusted computation windows, wherein the indirectly iteratively deriving of the one or more components includes individually calculating each respective one of the one or more components based on one or more components other than the respective one component.

9. The computing-system-implemented method of claim 1, wherein receiving a pair of data elements includes receiving a plurality of z pairs of data elements, and wherein the method further comprises iteratively performing, for each of the respective z pairs of data elements, the storing the received pair of data elements in the one or two data buffers, the adjusting the two pre-adjusted computation windows, the iteratively deriving a sum or a mean or both for each of the two adjusted computation windows, and the directly iteratively deriving one or more components of a covariance other than a sum and a mean for the two adjusted computation windows.

10. A computing system, the computing system comprising:
   one or more computing devices;
   each of the one or more computing devices comprising one or more processors;
   one or more storage media having one or two data buffers for storing data elements from one or two data streams; and
   one or more calculation modules that, when executed by at least one of the one or more computing devices, determine a covariance for two adjusted computation windows, wherein the determination of the covariance includes to:
   a. initialize a sum or a mean or both for each of two pre-adjusted computation windows of the one or two data buffers and one or more other components of a covariance for the two pre-adjusted computation windows, wherein each pre-adjusted computation window has a specified size n (n≥6) and contains n data elements of the one or two data buffers;
   b. receive a pair of data elements to be added to the two pre-adjusted computation windows;
   c. store the received pair of data elements in the one or two circular buffers;
   d. adjust the two pre-adjusted computation windows, including:

30 remove a least recently received pair of data elements from the two pre-adjusted computation windows; and
   add the to-be-added pair of data elements to the two pre-adjusted computation windows;
   e. iteratively calculate a sum or a mean or both for each of the two adjusted computation windows;
   f. directly iteratively calculate one or more components of a covariance other than a sum and a mean for the two adjusted computation windows based at least in part on the one or more components of the covariance other than a sum and a mean for the two pre-adjusted computation windows, wherein the direct iterative calculation of the one or more components for the two adjusted computation windows includes to remove any contribution of the removed pair of data elements from each of the one or more components for the two pre-adjusted computation windows mathematically and to add any contribution of the added pair of data elements to each of the one or more components for the two pre-adjusted computation windows mathematically without accessing and using all data elements in the two adjusted computation windows to reduce data access latency and operations performed by the computing system, thereby increasing calculation efficiency, saving computing resources and reducing the computing system's power consumption; and
   g. generate the covariance for the two adjusted computation windows based on one or more of the iteratively calculated components.

11. The computing system of claim 10, wherein the generating the covariance for the two adjusted computation windows includes calculating one of a sample covariance and a population covariance for the two adjusted computation windows.

12. The computing system of claim 10, wherein the one or more calculation modules, when executed by at least one of the one or more computing devices, perform b, c, d, e, f, and g multiple times.

13. The computing system of claim 12, wherein the performing g comprises generating the covariance for the two adjusted computation windows only when the covariance is accessed.

14. The computing system of claim 13, wherein the generating the covariance for the two adjusted computation windows comprises indirectly iteratively calculating one or more components of the covariance for the two adjusted computation windows, wherein the indirectly iteratively calculating one or more components includes individually calculating each respective one of the one or more components based on one or more components other than the respective one component.

15. The computing system of claim 10, wherein the one or more calculation modules, when executed by at least one of the one or more computing devices, perform b, c, d, e, and f multiple times.

16. A computing system program product for use at a configured computing system that comprises one or more computing devices and one or more storage media, each of the one or more computing devices comprising one or more processors, the one or more storage media having one or two buffers for storing data elements from one or two data streams, the computing system program product for implementing a method for generating a covariance for two adjusted computation windows, the computing system program product comprising one or more non-transitory computing-device-readable storage media having stored thereon computing-device-executable instructions that, when executed by at least one of the one or more computing devices in the configured computing system, cause the configured computing system to perform the method, the method including steps to:

initialize, by the configured computing system, a sum or a mean or both for each of two pre-adjusted computation windows of the one or two buffers and one or more other components of a covariance for the two pre-adjusted computation windows, wherein each of the two pre-adjusted computation windows has a specified size n (n≥6) and contains n data elements of the one or two buffers;

receive, by the configured computing system, a pair of data elements to be added to the two pre-adjusted computation windows;

store, by the configured computing system, the received pair of data elements in the one or two buffers;

adjust, by the configured computing system, the two pre-adjusted computation windows by removing a least recently received pair of data elements from the two pre-adjusted computation windows and adding the to-be-added pair of data elements to the two pre-adjusted computation windows;

iteratively calculate, by the configured computing system, a sum or a mean or both for each of the two adjusted computation windows;

directly iteratively calculate, by the configured computing system, one or more components of a covariance other than a sum and a mean for the two adjusted computation windows based at least in part on the one or more components other than a sum and a mean initialized or calculated for the two pre-adjusted computation windows, including to:

access the removed pair of data elements and the added pair of data elements without accessing all data elements in the two adjusted computation windows to reduce data accessing latency thereby saving computing resources and reducing the computing system's power consumption;

access the one or more components of the covariance other than a sum and a mean initialized or calculated for the two pre-adjusted computation windows; and remove any contribution of the removed pair of data elements from each of the accessed components mathematically and add any contribution of the added pair of data elements to each of the accessed components mathematically wherein not all data elements in the two adjusted computation windows are used during the iteratively calculating the one or more components to reduce operations performed by the computing system thereby increasing calculation efficiency; and generate, by the configured computing system, the covariance for the two adjusted computation windows based on one or more of the iteratively calculated components.

17. The computing system program product of claim 16, wherein the computing-device-executable instructions that, when executed, further cause the configured computing system to receive a pair of data elements, to store the received pair of data elements in the one or two buffers, to adjust the two pre-adjusted computation windows, to iteratively calculate a sum or a mean or both for each of the two adjusted computation windows, to directly iteratively calculate the one or more components other than a sum and a mean, and to generate the covariance for the two adjusted computation windows for each of multiple pairs of data elements to be received.

18. The computing system program product of claim 17, wherein the generating the covariance for the two adjusted computation windows comprises generating the covariance for the two adjusted computation windows only when the covariance is accessed.

19. The computing system program product of claim 18, wherein the generating the covariance for the two adjusted computation windows comprises indirectly iteratively calculating one or more components of the covariance for the two adjusted computation windows, wherein the indirectly iteratively calculating the one or more components includes individually calculating each respective one of the one or more components based on one or more components other than the respective one component.

20. The computing system program product of claim 16, wherein the computing-device-executable instructions that, when executed, further cause the configured computing system to receive a pair of data elements, to store the received pair of data elements in the one or two buffers, to adjust the two pre-adjusted computation windows, to iteratively calculate a sum or a mean or both for each of the two adjusted computation windows, and to directly iteratively calculate the one or more components other than a sum and a mean for each of multiple pairs of data elements to be received.

* * * * *